US012705771B2

(12) United States Patent
Brost et al.

(10) Patent No.: US 12,705,771 B2
(45) Date of Patent: Aug. 11, 2026

(54) HELIOSTAT OPTICAL ASSESSMENT

(71) Applicant: National Technology & Engineering Solutions of Sandia, LLC, Albuquerque, NM (US)

(72) Inventors: Randolph Brost, Albuquerque, NM (US); Daniel E. Small, Albuquerque, NM (US); David K. Novick, Albuquerque, NM (US); Julius Yellowhair, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 460 days.

(21) Appl. No.: 17/945,157

(22) Filed: Sep. 15, 2022

(65) Prior Publication Data

US 2023/0091829 A1 Mar. 23, 2023

Related U.S. Application Data

(60) Provisional application No. 63/245,458, filed on Sep. 17, 2021.

(51) Int. Cl.
*G06T 7/564* (2017.01)
*H02S 40/22* (2014.01)

(52) U.S. Cl.
CPC .............. *G06T 7/564* (2017.01); *H02S 40/22* (2014.12); *G06T 2207/30184* (2013.01)

(58) Field of Classification Search
CPC .... F24S 20/20; F24S 2050/25; F24S 2201/00; G06T 2207/10032; G06T 2207/30184; G06T 7/564; G06T 7/73; G06T 7/60; H02S 40/22; Y02E 10/47; G05D 3/10
See application file for complete search history.

(56) References Cited

U.S. PATENT DOCUMENTS

| | | | | |
|---|---|---|---|---|
| 8,122,878 | B1 | 2/2012 | Gross et al. | |
| 8,582,092 | B1 * | 11/2013 | Yellowhair | F24S 23/74 356/138 |
| 2011/0000478 | A1 * | 1/2011 | Reznik | F24S 50/20 126/576 |
| 2016/0009402 | A1 * | 1/2016 | Hunter | B64D 27/33 244/53 R |
| 2020/0027225 | A1 * | 1/2020 | Huang | G06T 7/73 |
| 2021/0110571 | A1 * | 4/2021 | Zhu | G06T 7/60 |

* cited by examiner

*Primary Examiner* — Michael J Vanchy, Jr.
(74) *Attorney, Agent, or Firm* — Daniel J. Jenkins

(57) ABSTRACT

Various embodiments may include collecting, by an unmanned aerial vehicle (UAV), a measuring image of an assessed heliostat in a heliostat field. The measuring image of the assessed heliostat includes an assessed facet forming a reflective surface of the assessed heliostat. At least a portion of a reference heliostat is visible in a reflection on the assessed facet. Also, a surface normal variance between a calculated surface normal of the assessed heliostat and a presumed surface normal of the assessed heliostat may be collected. The calculated surface normal is determined from a point on the assessed facet that corresponds to one or more features of the reference heliostat identifiable in the reflection. The presumed surface normal of the assessed heliostat may be updated based on the determined surface normal variance.

20 Claims, 11 Drawing Sheets

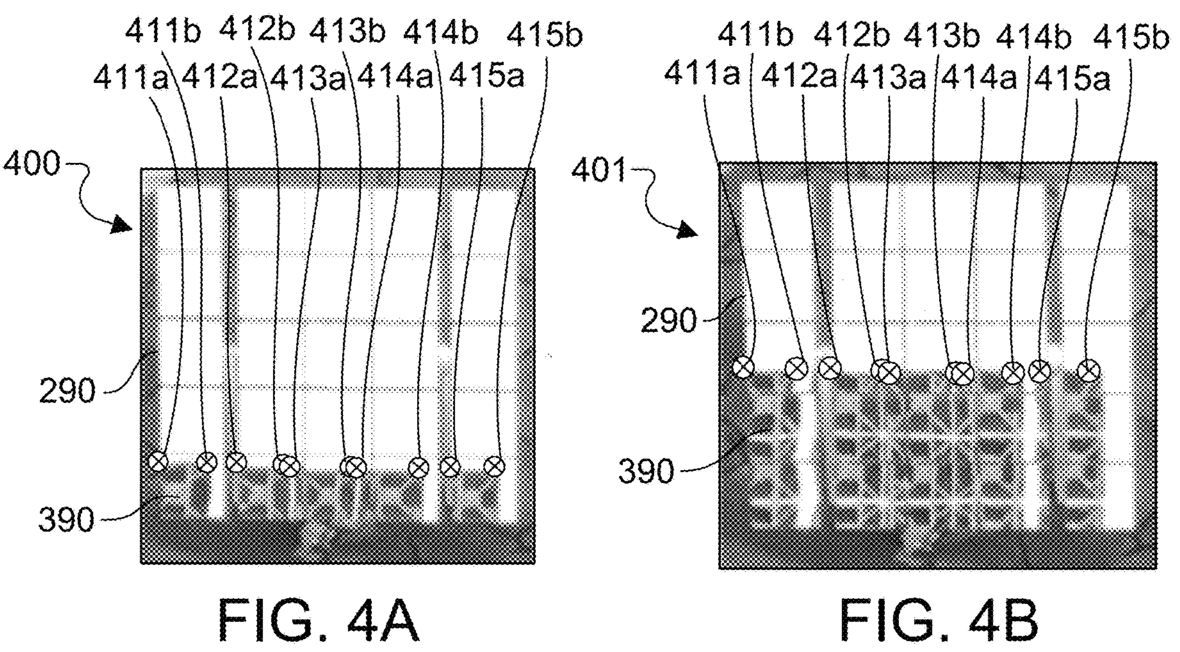
FIG. 4A
FIG. 4B
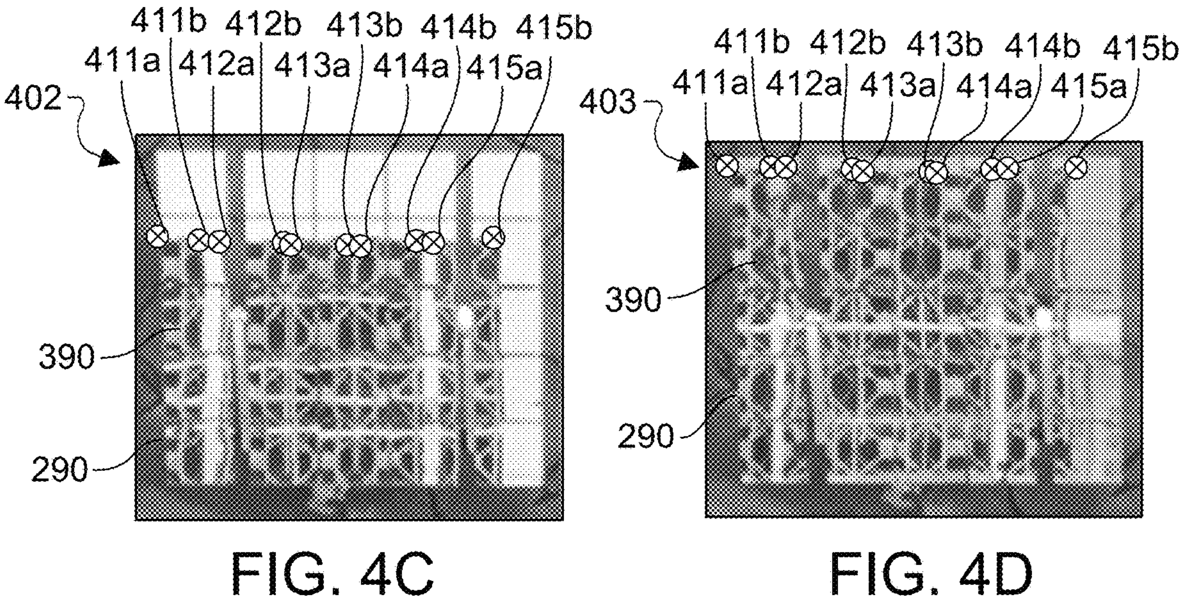
FIG. 4C
FIG. 4D

HELIOSTAT OPTICAL ASSESSMENT

RELATED APPLICATIONS

This application claims the benefit of priority to U.S. Provisional Application No. 63/245,458 entitled "Systems and Methods to Perform Heliostat Optical Assessment Using Aerial Vehicles and Reflected Edges," filed Sep. 17, 2021, the entire contents of which is incorporated herein by reference.

STATEMENT REGARDING FEDERALLY SPONSORED RESEARCH OR DEVELOPMENT

Described examples were made with Government support under Contract No. DE-NA0003525 awarded by the United States Department of Energy/National Nuclear Security Administration. The U.S. Government has certain rights in this invention.

BACKGROUND

Concentrating solar power (CSP) plants operate by using mirrors to reflect sunlight onto a solar receiver, such as on a solar tower, generating heat that is used to do useful work. Productive operation requires that the mirror have high optical accuracy, meaning that for every point on the mirror, its local surface normal matches the design intent.

Heliostats are articulated mirrors that move under computer control. For large heliostats, the mirror may be composed of multiple facets, which are connected and arranged in an array to form the entire heliostat mirror. Each facet is formed to a desired optical shape, usually an approximation of a paraboloid. Deviations from the design intent may occur when a facet shape does not match the design paraboloid, when one or more facets are mounted at an incorrect orientation, or when the computer control system points the heliostat mirror in an incorrect direction. These conditions are referred to as slope, canting, and pointing error, respectively. Any of these errors can cause reflected sunlight to miss or partially miss the intended receiver target, reducing the productivity of the CSP plant.

Measurement systems are needed during CSP plant construction to ensure that mirrors are initially fabricated and installed to precisely achieve desired mirror surface normals. Instruments are needed to measure these properties of individual facets, full heliostats, and heliostat pointing to assure initial quality. In addition, over time the heliostats and/or individual facets thereof may get altered do the weather and/or deterioration. Thus, during operation, repeat measurements should be conducted to verify field performance, diagnose problems, and determine whether individual heliostats or facets need maintenance. A variety of instruments have been built for indoor use measuring individual mirror facets, but outdoor measurements of full heliostats remain a difficult challenge.

Measurement of heliostats in their installed location outdoors is difficult because of the sheer size of the solar field and the number of heliostats. A commercial concentrating solar power plant many include over 100,000 heliostats. These enormous numbers, combined with the difficulty of accessing heliostat locations and obtaining a clear field of view of a heliostat, indicate that an efficient inspection system is needed, preferably one that can obtain a viewpoint from above.

The need remains, therefore, for systems and methods to ensure that mirrors are initially fabricated, assembled, installed, and operated to precisely achieve and maintain desired mirror surface normals. Measurement is needed during production and installation to ensure process control, and then to initially calibrate the heliostats. Follow-on measurements are needed to verify correct operation, tune heliostat aiming precision, and detect and correct changes that might occur due to causes such as wear, disturbances due to extreme weather events, creep, collisions with vehicles or wildlife, and so on.

SUMMARY

The systems, methods, and devices of the present invention enable heliostat optical alignment. The heliostat alignment is performed by collecting, by an unmanned aerial vehicle (UAV), a measuring image of an assessed heliostat in a heliostat field. The measuring image of the assessed heliostat includes an assessed facet forming a reflective surface of the assessed heliostat. At least a portion of a reference heliostat is visible in a reflection on the assessed facet. The heliostat alignment also includes determining a surface normal variance between a calculated surface normal of the assessed heliostat and a presumed surface normal of the assessed heliostat. The calculated surface normal is determined from a point on the assessed facet that corresponds to one or more features of the reference heliostat identifiable in the reflection. The heliostat alignment additionally includes updating the presumed surface normal of the assessed heliostat based on the determined surface normal variance.

In some embodiments, the measuring image is collected by the UAV while traversing along a predetermined flight path, wherein the UAV traverses the predetermined flight path over the assessed heliostat with a characteristic selected from at least one of a constant heading, a constant speed, or a constant gaze angle of an imaging sensor used to collect the measuring image. In some embodiments, the predetermined flight path passes the assessed heliostat from one of a front-to-back direction or a back-to-front direction of the assessed heliostat. In some embodiments, the predetermined flight path passes the assessed heliostat in a direction with a lateral component, wherein the lateral component traverses laterally relative to the assessed heliostat. In some embodiments, the predetermined flight path passes the assessed heliostat in a lateral direction relative to the assessed heliostat.

Some embodiments further include collecting a locating image of the assessed heliostat, wherein an edge of the assessed heliostat visible in the locating image identifies the assessed heliostat. In some embodiments, the locating image does not contain the reflection of the reference heliostat.

In some embodiments the one or more features of the reference heliostat identifiable in the reflection, used to determine the calculated surface normal, correspond to an edge of a reference facet of the reference heliostat. In some embodiments, the edge of the reference facet includes two points on the reference facet that correspond to upper corners of the reference facet on the reference heliostat. In some embodiments, the one or more features of the reference heliostat identifiable in the reflection, used to determine the calculated surface normal, correspond to fiducial marks located on the reference facets. In some embodiments, the calculated surface normal is determined from a plurality of points on the assessed facet. In some embodiments, the calculated surface normal is determined from a plurality of points on the assessed heliostat.

Various embodiments include a computing device for aligning heliostats in a heliostat field with a solar receiver. The computing device may include a radio module and a processor coupled to the radio module. The processor may be configured to receive a measuring image of an assessed heliostat in the heliostat field. The measuring image of the assessed heliostat may include an assessed facet forming a reflective surface of the assessed heliostat. At least a portion of a reference heliostat may be visible in a reflection on the assessed facet. The processor may also determine a surface normal variance between a calculated surface normal of the assessed heliostat and a presumed surface normal of the assessed heliostat. The calculated surface normal may be determined from a point on the assessed facet that corresponds to one or more features of the reference heliostat identifiable in the reflection. The processor may also update the presumed surface normal of the assessed heliostat based on the determined surface normal variance.

Various embodiments include a heliostat field alignment system. The system may include an assessed and a reference heliostat arranged in the heliostat field. The assessed heliostat may include an assessed facet forming a reflective surface of the assessed heliostat. The system may also include an unmanned aerial vehicle (UAV) configured to collect a measuring image of the assessed heliostat. At least a portion of the reference heliostat may be visible in a reflection on the assessed facet. The system may also include a computing device configured to determine a surface normal variance between a calculated surface normal of the assessed heliostat and a presumed surface normal of the assessed heliostat. The calculated surface normal may be determined from a point on the assessed facet that corresponds to one or more features of the reference heliostat identifiable in the reflection. The computing device may be configured to update the presumed surface normal of the assessed heliostat based on the determined surface normal variance.

In some embodiments, heliostat field alignment system may include a solar receiver configured to collect reflected sunlight from the heliostat field. The updated presumed surface normal of the assessed heliostat may be configured to bisect an angle between the Sun and a target area of the solar receiver. In some embodiments, the measuring image may be collected by the UAV while traversing along a predetermined flight path, wherein the UAV traverses the predetermined flight path over the assessed heliostat with a characteristic selected from at least one of a constant heading, a constant speed, or a constant gaze angle of an imaging sensor used to collect the measuring image. In some embodiments, the computing device may be further configured to collect a locating image of the assessed heliostat, wherein one or more edges of the assessed heliostat are visible in the locating image identifies the assessed heliostat.

Systems, devices, and methods are disclosed to measure heliostat surface normals across each assessed heliostat, which are then used to compute optical error estimates in their installed location. Various embodiments use an Unmanned Aerial Vehicle (UAV) over a heliostat field to assess errors in the heliostat mirrors. In an embodiment, the UAV is positioned to capture an image of an assessed heliostat, positioned so that an adjacent reference heliostat may be visible in a reflection from the assessed heliostat reflective surface(s). Image processing may identify the adjacent reference heliostat in the reflected image and be used to correct orientation errors of the assessed heliostat.

Embodiments disclosed herein are directed to systems, devices, and methods to ensure that heliostats are initially fabricated, installed, and operated correctly to precisely achieve desired mirror surface normal vectors (hereafter referred to as "surface normals"). Ensuring desired surface normal precision may include initial measurements for process control, supporting installation assembly operations, providing data for initial field calibration, and providing ongoing inspection data for field monitoring and performance improvement. Various embodiments assess heliostat performance by flying a UAV with a camera across a heliostat field, through a predetermined flight path. The predetermined flight path may traverse a series of predefined positions and travel at a constant speed, heading, and associated camera gaze angles, to capture a series of measuring images. The predetermined flight path and gaze angle may enable a camera to record a series of images of assessed heliostats in succession. For each assessed heliostat, a series of images that include reflections of one or more adjacent heliostats in the mirrored facets of the assessed heliostat may show the reflection of the adjacent heliostat sweeping across the assessed heliostats. Automated image processing may then be applied to analyze these images and reflections to identify surface normals across each assessed heliostat, which may then be used to compute optical error estimates. The sequence of images may also be used for other purposes, such as inspecting heliostat mirrors for damage.

An advantage of the present disclosure is that the system may assess large numbers of heliostats in a short period of time. In preferred embodiments, the predetermined flight path of the UAV may include sweeping linear segments that are traversed at constant speed and heading (i.e., in a straight line), while maintaining a constant or smoothly varying camera gaze angle. By keeping the speed constant, as well as the heading and gaze angle, positional measurements of the heliostats and/or the individual facets thereof, may be made relative to the UAV and/or the heliostat field. For example, over 150 heliostats may be scanned within a single 20-minute UAV flight. Higher speeds may be possible by employing faster image capture hardware along with other improvements. Such high speed measurements may enable repeated and frequent regular scans of the heliostat field, which may help maintain low pointing errors (i.e., errors in a direction of a surface normal) and thus improve efficiencies of the heliostat field.

Another advantage of various embodiments is that measurements may be taken over an operating heliostat field. The predetermined flight path may be designed to be inherently low altitude (i.e., near the ground), relative to the solar receiver, which may enable the UAV to avoid the dangerous areas of high solar flux concentration that may be encountered at higher altitudes near the solar receiver. Further, various embodiments are designed to take advantage of the geometric situation of an operating heliostat field, where many operating heliostats provide a broad horizon of fixed reference points to serve as optical reference targets. This in-turn may facilitate both high collected data density and fast measurement since fewer passes may be required. The ability to take measurements over an operating heliostat field may avoid having to cease the operations of that heliostat field, which would result in a loss of revenue.

Another advantage of various embodiments is that they facilitate robust image processing. The predetermined flight path(s), using fixed gaze angles, may ensure that each assessed heliostat is viewed from a perspective where it is reflecting large regions of sky, which may provide high-contrast backgrounds that facilitate identification and image analysis of the assessed heliostat. Using known spacing and angles of the heliostat field, high-contrast imaging may facilitate automatic identification of each heliostat and its facet boundaries. An initial identification of heliostats may be used to track the progression and/or changes to heliostat boundary features (e.g., edges, corners, and/or other points). Such initial identifications may be useful for reference in concentrated heliostat fields in which multiple adjacent heliostats are visible within the UAV camera's field of view. The progression and/or changes to heliostat boundary features may be tracked forward or backward in time, providing useful data sets for heliostat inspection, assessment, and correction.

Another advantage of various embodiments is that by using the reflected images of adjacent heliostats, the system does not rely upon the structure and position of the receiver, which is often a solar tower. Using large structures like the solar tower may only provide one degree of constraint because often only a vertical edge of the solar tower may be visible in reflected images. In addition, reflections of the solar tower may only be used after construction of the solar tower is complete. Thus, using the solar tower for measurements of the heliostat field means such measurements may not be taken while the heliostat field is being constructed if the solar tower is not already complete or nearly complete. Delays in measuring the heliostat field may add delays to the operational status of the overall solar plant, which in-turn may delay returns on investments.

Another advantage of various embodiments is that precise measures may be taken of multiple heliostat elements, such as the facets thereon. Measurements and estimates of the surface normal of a heliostat and/or the individual facets of the heliostat may ensure proper targeting of the solar receiver by the heliostat. Such measurements may be repeated many times during a single pass over each heliostat. For example, a predetermined flight path of a UAV, imaging the heliostat field, may take thousands of measurements across many heliostats within the heliostat field. In fact, individual heliostats may have many measurements taken with a single pass of the UAV, which in-turn may enable an estimation of slope, canting, and pointing error.

Another advantage of various embodiments is that heliostats may be measured in their installed location, without requiring large and unwieldy optical targets required by some other methods. By using features on adjacent heliostats as optical reference targets, no additional hardware components are required. In addition, the methods, devices, and systems of the present disclosure may enable measurements of heliostats that are currently operating without having to take them off-line. Not having to take any part of a heliostat field off-line can help the overall rate of power production.

Another advantage of various embodiments is that measurements of the locations of heliostats in the heliostat field may be taken along with more detailed measurements of elements of the heliostats, like the facets thereof. These embodiments may replace high-precision surveys of heliostat locations and as-built geometry by other means.

These and other features, objects, and advantages of the present disclosure will be further understood and apparent from the following specification, claims, and appended drawings.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 4A-4D show optical reference targets in select images from a left-to-right series of images according to various embodiments.

DETAILED DESCRIPTION

Figure 1A:
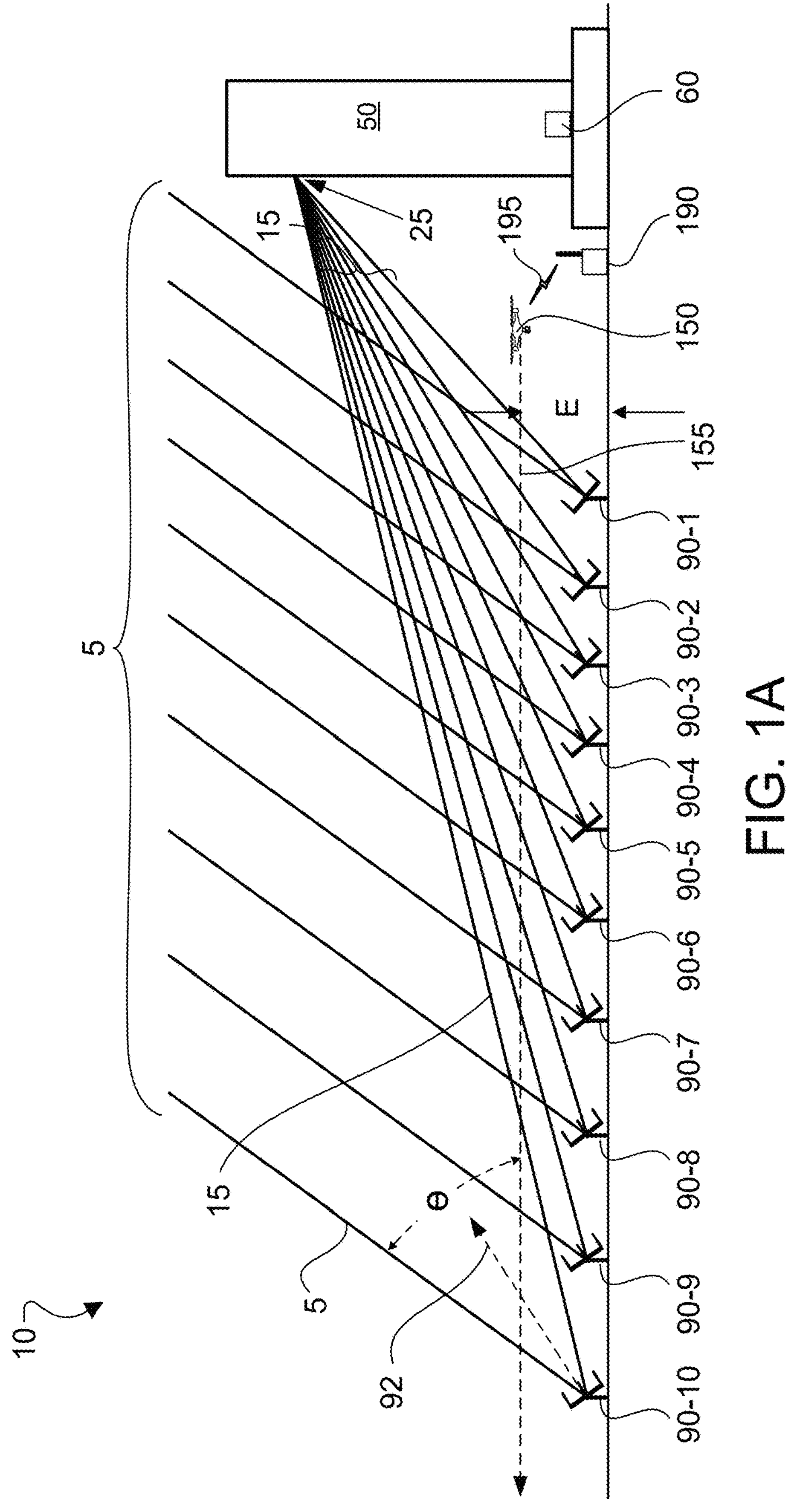
FIGS. 1A and 1B are side elevation views of a heliostat field alignment system suitable for use with various embodiments.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Various embodiments are directed to systems, devices, and methods for assessing heliostats, including optical properties thereof, in their installed location. In particular, various embodiments use a UAV to capture one or more images of an assessed heliostat and use the reflection of a reference heliostat (e.g., an adjacent heliostat) to assess parameters of the assessed heliostat. Image processing may identify features on a backside of the adjacent heliostat visible in the reflection on the frontside of the assessed heliostat to precisely measure a position of the assessed heliostat and elements thereof (e.g., facets of the assessed heliostat) relative to the heliostat field. Precise measurement of the position of the assessed heliostat may be used to assess, adjust, and/or improve performance of the assessed heliostat.

Various embodiments collect one or more measuring images of an assessed heliostat in a heliostat field. The measuring image(s) of the assessed heliostat include(s) one or more facets forming a reflective surface of the assessed heliostat. At least a portion of a reference heliostat may be visible in a reflection on the assessed facet. A surface normal variance may be determined based on a difference between a calculated surface normal of the assessed heliostat and a presumed surface normal of the assessed heliostat. The calculated surface normal may be determined from a point on the assessed facet that corresponds to one or more features of the reference heliostat identifiable in the reflection. The presumed surface normal of the first heliostat may be updated based on the determined surface normal variance.

As used herein, the term “heliostat” refers to a device with one or more mirrored facets configured to reflect sunlight to a solar receiver as a component of concentrated solar-thermal power technologies. Using the known progression of the sun’s movement, azimuth, and tilt angles of a series of heliostats or individual heliostats may be continuously changed to ensure sunlight is reflected toward a predetermined receiver target, such as the solar receiver mounted high on a solar tower. A heliostat is generally constructed with one or more distinct facets, which together form the reflective surfaces of the heliostat. As used herein, the expressions “assessed heliostat” or “assessed facet” refers to a heliostat or individual facet, respectively, being directly imaged and assessed in accordance with various embodiments. In addition, as used herein, the expressions “reference heliostat” or “reference facets” refer to a heliostat or individual facet, respectively, that is indirectly imaged through reflection on facets of the assessed heliostat.

As used herein, the expression “surface normal” refers to a vector that is perpendicular to a surface, such as a surface of the heliostat or more particularly the surface of a facet or group of facets. In order to reflect sunlight toward a solar receiver, a surface normal of a heliostat may be aimed toward the sky in a target direction that bisects a reflection angle used to redirect sunlight to the solar receiver. The reflection angle may be defined by the space between two intersecting lines, namely a first line extending from the heliostat toward the Sun and a second line extending from the heliostat toward a target area of the solar receiver. Since numerous heliostats are generally directing sunlight at the target area, all the heliostats do not need to be aimed at the same exact point on the solar receiver.

As used herein, the expression “heliostat field” refers to a series of heliostats located in close proximity to one another in a region and configured to work collectively to concentrate solar-thermal power.

As used herein, the term “UAV” refers to one of various types of unmanned aerial vehicles. A UAV may include an onboard computing device configured to fly and/or operate the UAV without remote operating instructions (i.e., autonomously), and/or with some remote operating instructions or updates to instructions stored in a memory, such as from a human operator or remote computing device (i.e., semi-autonomously). UAVs may be propelled for flight in any of a number of known ways. For example, a plurality of propulsion units, each including one or more rotors, may provide propulsion or lifting forces for the UAV and any payload carried by the UAV. In addition, UAVs may include wheels, tank-treads, or other non-aerial movement mechanisms to enable movement on the ground, on or in water, and combinations thereof. The UAV may be powered by one or more types of power source, such as electrical, chemical, electro-chemical, or other power reserve, which may power the propulsion units, the onboard computing device, and/or other onboard components.

The term “computing device” is used herein to refer to an electronic device equipped with at least a processor. Examples of computing devices may include UAV flight control and/or mission management computer that are onboard the UAV, as well as remote computing devices communicating with the UAV configured to perform operations of the various embodiments. Remote computing devices may include wireless communication devices (e.g., cellular telephones, wearable devices, smart-phones, web-pads, tablet computers, Internet enabled cellular telephones, Wi-Fi® enabled electronic devices, personal data assistants (PDAs), laptop computers, etc.), personal computers, and servers. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi® router, etc.).

Figure 1B:
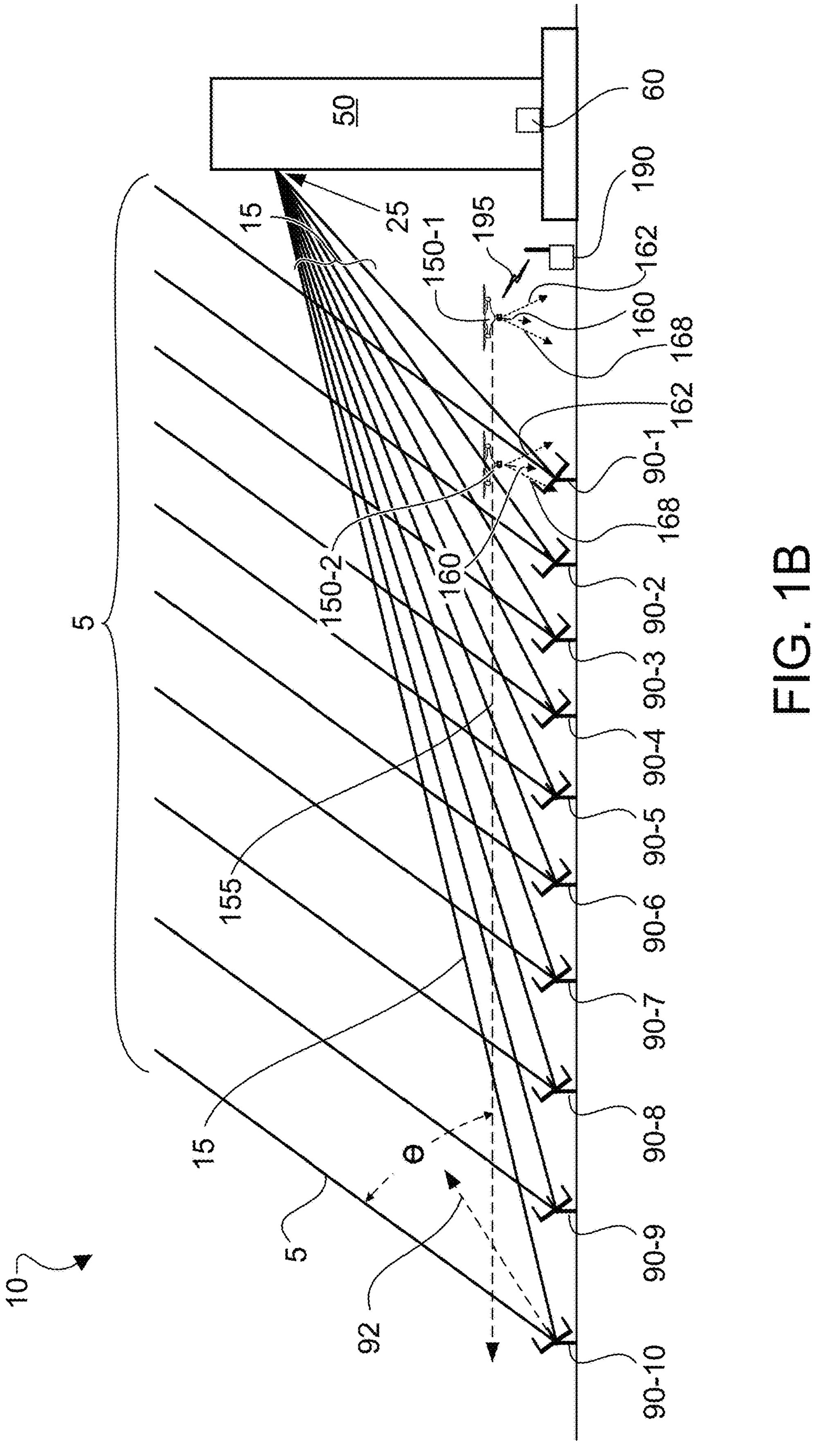
Figure 1C:
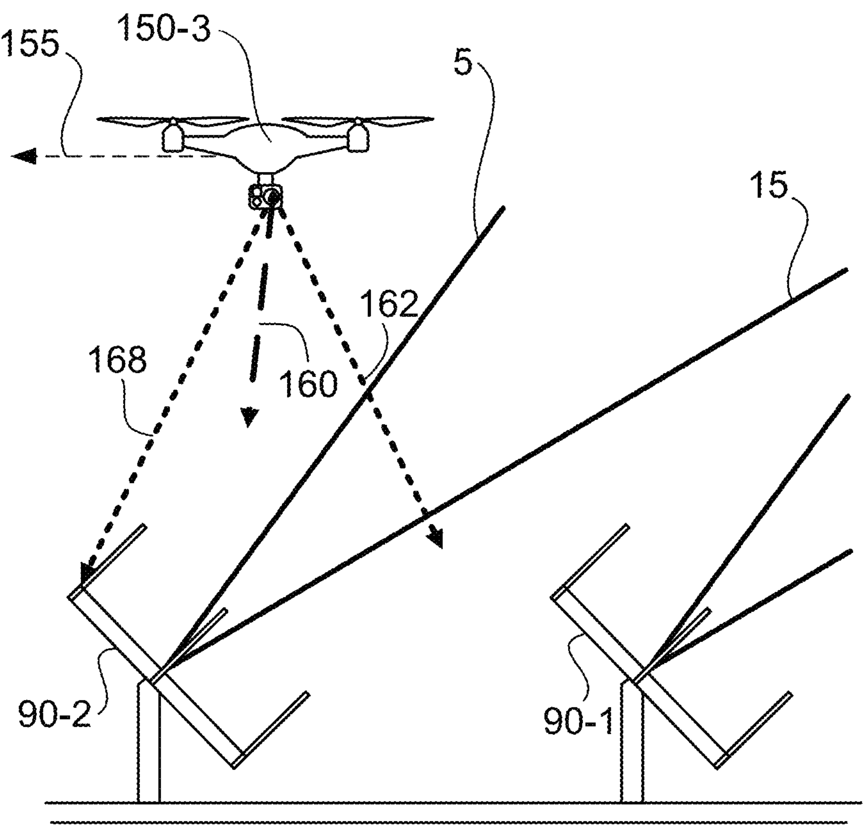
FIG. 1C is a closeup side elevation view of a UAV following a predetermined flight path suitable for use with various embodiments.

FIGS. 1A-1B illustrates a two-dimensional elevation view of heliostat field alignment system 10 in accordance with various embodiments. The heliostat field alignment system 10 includes a plurality of heliostats 90-1, 90-2, 90-3, 90-4, 90-5, 90-6, 90-7, 90-8, 90-9, 90-10 (also referred to collectively as just “heliostats 90”) arranged in a row extending away from a solar tower 50 that includes a solar receiver 25. In addition to the heliostats 90, the heliostat field alignment system 10 may include a UAV 150 that is configured to collect images of the heliostats 90. FIG. 1C is a close-up view of the first two heliostats 90-1, 90-2 and the UAV 150.

The heliostats 90 may be part of a larger heliostat field. For example, the larger heliostat field may include one or more additional rows of heliostats. In fact, various embodiments may apply to heliostat fields that include hundreds or even thousands of rows of heliostats. The rows of heliostats may extend radially away from the solar tower. One or more solar receivers 25 may be configured to face the rows.

With reference to FIGS. 1A and 1B, rays of sunlight 5 are illustrated as reflecting off the heliostats 90-1, 90-2, 90-3, 90-4, 90-5, 90-6, 90-7, 90-8, 90-9, 90-10 and the reflected light 15 directed at the solar receiver 25. In order to aim the reflected light 15 directly at the solar receiver 25, a surface normal 92 of each of the heliostats 90 may be aimed toward the sky in a target direction that bisects a reflection angle θ used to redirect sunlight to the solar receiver 25. The reflection angle θ may be defined by the space between a first line extending from the heliostat (e.g., any one of 90-1, 90-2, 90-3, 90-4, 90-5, 90-6, 90-7, 90-8, 90-9, 90-10) toward the Sun and a second line extending from the heliostat toward the solar receiver 25. The surface normal 92 for each of the heliostats 90 may vary slightly with proximity of the respective heliostats 90 to the solar receiver 25.

In accordance with various embodiments, the UAV 150 may include an optical sensor (e.g., a camera) configured to collect images of the heliostats 90. In addition, the UAV 150 may be configured to communicate with a computing device 190, such as through wireless signals 195. The computing device 190 may operate as a controller of the UAV 150 and/or may be configured to process imaging collected by the UAV 150.

As shown in FIG. 1A, the UAV 150 may be configured to navigate a predetermined flight path 155 that passes over the heliostats 90 at a constant heading and/or speed. In addition, as shown in FIG. 1B, when traversing the predetermined flight path 155, an optical sensor of the UAV 150 may be aimed down toward the heliostats 90 in a constant or varying gaze direction 160, which is associated with a constant gaze angle. The optical sensor may include one or more camera(s) (e.g., 1020 in FIG. 10), which may be capable of capturing and distinguishing visible, infrared, ultraviolet, and/or other wavelengths of light. The gaze angle may be measured by a space between the constant gaze direction 160 and the predetermined flight path 155. Although the predetermined flight path 155 is illustrated as passing the heliostats 90 from front-to-back, the predetermined flight path 155 may be reversed (i.e., from back-to-front). Additionally, or alternatively, the predetermined flight path 155 may consist of or include a lateral component, passing laterally across the heliostats 90.

As the UAV 150 traverses the predetermined flight path 155 and passes over the heliostats 90, the individual heliostats 90 will enter a field of view of the optical sensor. In this way, images may be collected of heliostats 90 as they enter the field of view. The field of view of the optical sensor is denoted as the region between a bottom edge 162 and a top edge 168 of the arrows extending from a bottom of the UAV 150. For example, as shown in FIG. 1B, at first position 150-1, no heliostat is visible in the field of view since no heliostat lies between the bottom edge 162 and the top edge 168 of the field of view. In contrast, at second position 150-2, the UAV is passing over the first heliostat 90-1, which is clearly within the field of view. Although the first heliostat 90-1 may be visible at the second position 150-2, since no other heliostat is positioned in front of the first heliostat 90-1, no other heliostat will be visible in a reflection on the facets of the first heliostat 90-1.

FIG. 1C illustrates a third position 150-3 in which the UAV (e.g., 150) is now passing over the second heliostat 90-2. In the third position 150-3, not only is the second heliostat 90-2 visible within the field of view, but also a back of the first heliostat 90-1 may be visible in the reflections on the facets of the second heliostat 90-2. By measuring a relative position of the first heliostat 90-1 in the reflection on the facets of the second heliostat 90-2, various embodiments use the known geometry of the heliostats and the heliostat field to assess characteristics of the second heliostat 90-2. In this way, the measured relative positions may be used to calculate a direction of a surface normal of the second heliostat 90-2, which in this instance may be referred to as the assessed heliostat. As used herein, the expression "assessed heliostat" or "assessed facet" refer to the heliostat or facet thereof that is being directly imaged, as opposed to any other heliostat visible in the reflection. The calculated surface normal may then be compared to a previously calculated surface normal to determine whether any variance in the surface normal exists.

Figure 2:
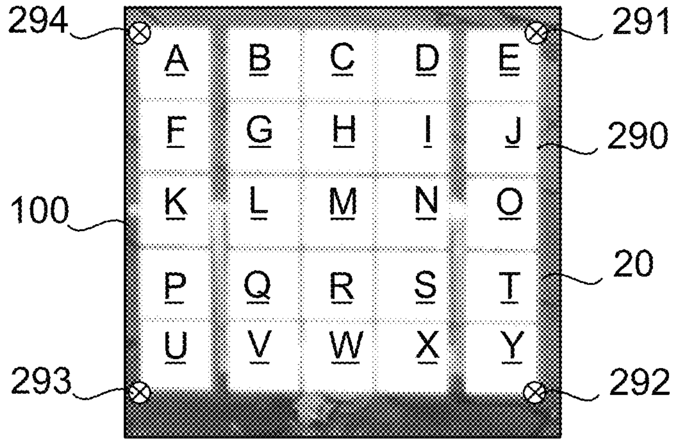
FIG. 2 shows an image of an assessed heliostat in accordance with various embodiments.

FIG. 2 illustrates an image 100 of an assessed heliostat 290 (e.g., taken by an optical sensor of a UAV (e.g., 150)) in accordance with various embodiments. The dark outer boundaries 20 represent the contrast of the ground and/or surrounding equipment beyond the peripheral edges of the heliostat 290. A face of the assessed heliostat 290 (i.e., facing the image sensor taking the image) is covered with twenty five (25) facets A-Y that form reflective surfaces of the heliostat 290. Although heliostat 290 includes twenty five facets A-Y, heliostats may include a greater or lesser number of facets.

In FIG. 2, the facets A-Y are illustrated reflecting only the clear sky, which is illustrated as all the facets A-Y appearing blank. For example, the image 100 may have been taken when the UAV was in the second position (e.g., 150-2 in FIG. 1B). Since the facets A-Y are mirrored surfaces, anything visible in a reflection of an individual facet (e.g., any one or more of facets A-Y) should be visible on that facet in the image 100. Thus, clouds, birds, airplanes, other nearby structures (e.g., an adjacent heliostat), and/or reflections of other elements may be visible in the image 100 depending upon the position of the UAV (e.g., 150) and the gaze direction (e.g., 160) at which the image 100 was captured.

Some embodiments may collect locating images, like the image 100, to identify which heliostat in the heliostat field is visible therein. Using points on the assessed heliostat, visible in the locating image, some embodiment may identify the assessed heliostat. Although images that include features from adjacent structures, such as a neighboring heliostat, may be used as locating images, they are not necessary for identifying heliostats. Thus, although image 100 does not include a portion of a reference heliostat visible in the reflection on the facets, it may be useful for locating the assessed heliostat 290 within the heliostat field 90.

To simplify computation, information from one image may be used to identify where to focus with regard to subsequent images. The locating image illustrated by FIG. 2 is an example of this, but similar information may be passed along from measuring images collected during the various passes. For example, heliostat edges identified in a first image may provide focus regions that may be identified for the analysis of subsequent images. The focus regions may exploit temporal locality to constrain the search to a much smaller effective image size. For smooth continuous motion captured at video frame rates, the change from one image to the next may be small. This allows a heliostat assessment algorithm to consider a small region of interest in which to focus image analysis. One advantage of this is that it reduces computational work, which may speed processing. Another advantage is that it also constrains the computer vision problem to a more narrowly circumscribed task of identifying expected features within a small region of interest. This eliminates the need to disambiguate all of the clutter that may occur in a complex reflected image.

The images (e.g., 100) collected by the UAV may be associated with an aerial location from which they were taken. Using a Global Positioning System (GPS) and/or other location sensors, the UAV may keep track of its location, heading, and altitude above the heliostat field (e.g., 90). UAV location may also be inferred by image processing, using nominal locations of heliostats or ground features for reference. Knowing the UAV location, heading, and the gaze angle of the UAV's optical sensor, course measurements of any given assessed heliostat 290 from a locating image may be used to identify the location of that assessed heliostat 290 in the image. Using optical sensors and image analysis, such as computer vision or other techniques that enable object/feature recognition or detection, a periphery of the assessed heliostat 290 may be identified. In particular, image analysis may be used to identify at least two of the points 291, 292, 293, 294, which may act as optical reference targets, and thus locate the assessed heliostat 290 captured in the image 100. With the location of the assessed heliostat 290 in the image known, the assessed heliostat 290 may be identified. Such identification may include detailed information about the particular heliostat or merely include coordinates that may act like an address to identify the heliostat. In this way, a relative location of the assessed heliostat 290 may be calculated by detecting facet edges, or preferably corners, such as points 291, 292, 293, 294, thereof in the image 100.

Figure 3A:
FIG. 3A shows a bottom-to-top series of images collected of an assessed heliostat in accordance with various embodiments.
Figure 3A:
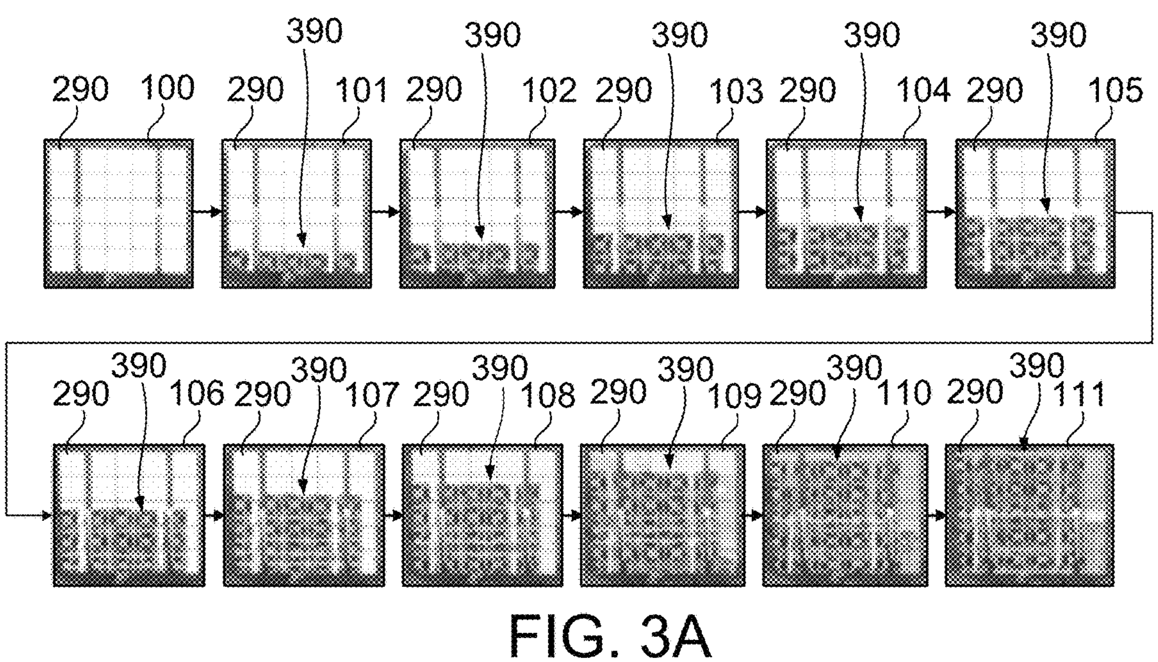
Figure 3B:
FIG. 3B shows a left-to-right series of images collected of an assessed heliostat in accordance with various embodiments.
Figure 3B:
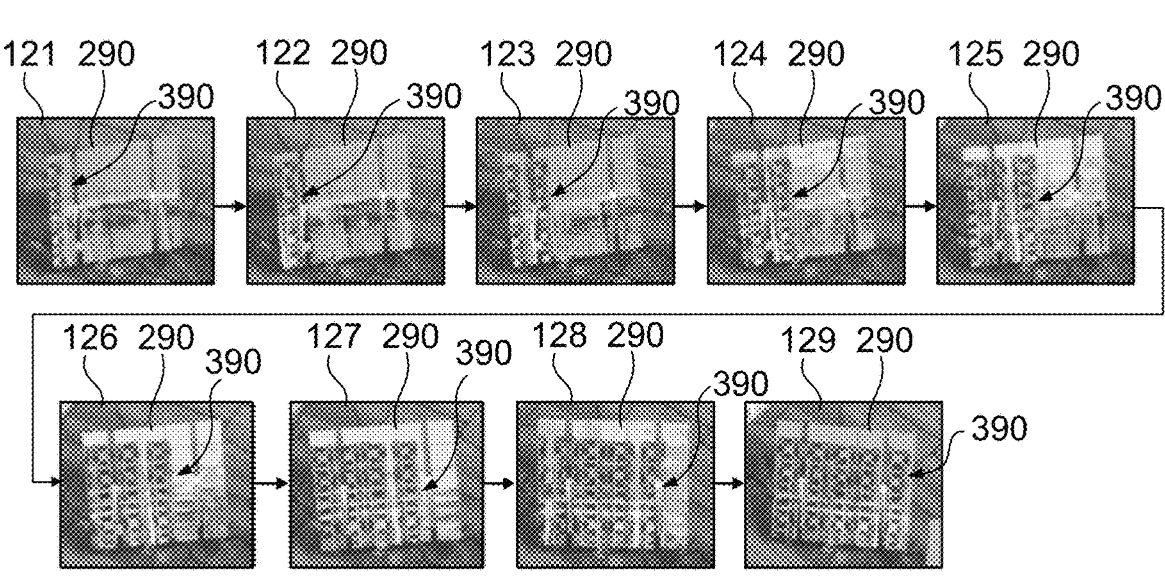

FIGS. 3A-3B illustrate two different series 300, 301 of images taken as a UAV (e.g., 150) flies over an assessed heliostat 290 (e.g., the second heliostat 90-2 in the row illustrated in FIGS. 1A and 1B). The series 300, 301 show how a reference heliostat 390 (e.g., the first heliostat 90-1 in the row illustrated in FIGS. 1A and 1B) gradually appears visible on the facets of the assessed heliostat 290 as the UAV flies overhead. The UAV may operate taking images at 30 Hz or higher, thus taking 30 measuring images per second or more. Thus, the number of images collected in a single pass of the assessed heliostat may be greater or optionally fewer than the numbers shown in the series 300, 301.

FIG. 3A particularly illustrates a bottom-to-top series 300 of twelve (12) images 100-111 collected as the UAV (e.g., 150) is flown through a range of positions over the assessed heliostat 290 so that a top edge of the other heliostat 390 is visible in a reflection on the facets of the assessed heliostat 290 and progressively sweeps from bottom to top in subsequent images of the bottom-to-top series 300. The bottom-to-top series 300 of images 110-111 illustrate a front-to-back flight path, which has the UAV approaching the assessed heliostat 290 from the side with the reflective facets. In the second image 101, a top portion of the reference heliostat 390 is now visible in the reflection from the assessed heliostat 290. Subsequent images 102-111 in the series show more and more of the reference heliostat 390. In fact, in the last image 111, the entirety of the back of the reference heliostat 390 is visible in the reflection. In the bottom-to-top series 300, a top edge of the reference heliostat 390 appears to sweep from the bottom of the assessed heliostat 290 to the top of assessed heliostat 290.

FIG. 3B particularly illustrates a left-to-right series 301 of nine (9) images 121-129 collected as the UAV (e.g., 150) is flown through a range of positions over the assessed heliostat 290 so that a side edge of the reference heliostat 390 is visible in a reflection on the facets of the assessed heliostat 290 and progressively sweeps from left to right in subsequent images of the left-to-right series 301. The left-to-right series 300 of images 121-129 illustrate a left-to-right flight path, which has the UAV approaching the assessed heliostat 290 from a lateral side, but still facing the reflective facets. In the first image 121, a right edge of the reference heliostat 390 is visible in the reflection from the assessed heliostat 290. Subsequent images 122-129 in the left-to-right series 301 show more and more of the reference heliostat 390. In fact, in the last image 129, the entirety of the back of the reference heliostat 390 is visible in the reflection. In lateral scans such as the left-to-right series 301, a side edge of the reference heliostat 390 appears to sweep from one side of the assessed heliostat 290 to the opposed side of assessed heliostat 290.

Side-to-side flight paths, such as the left-to-right flight path or a right-to-left flight path, may encounter problems when the entire heliostat field (e.g., 90) is operating, which is very common. Since all of the assessed heliostats (e.g., 290) are tilted at a positive angle, the reflected images of the reference (adjacent) heliostats in the background during a side-to-side flight path may be difficult to distinguish or identify (e.g., overlapping structures). Thus, side-to-side flight paths may be used when the entire field is not operating. For example, during heliostat field construction and prove-out, or when the heliostat field is not operating for other reasons.

FIGS. 4A-4D illustrate optical reference targets in select images 400, 401, 402, 403 from the left-to-right series of images shown in FIG. 3A, in accordance with various embodiments. The four (4) select images 400, 401, 402, 403 include the assessed heliostat 290 at different points along the UAV's predetermined flight path (e.g., 155). The measuring images 400, 401, 402, 403 may be a subset of a greater number of measuring images taken during a single pass by a UAV (e.g., 150). In contrast to locating images (e.g., 100), measuring images 400, 401, 402, 403 preferably include not only the assessed heliostat 290, but also include features from adjacent structures, such as a reference heliostat 390 visible in a reflection on one or more of the assessed facets (e.g., A-Z in FIG. 2).

In various embodiments more precise assessment information related to the assessed heliostat 290 may be obtained by detection of a point (e.g., edges or corners) of the individual facets of the assessed heliostat 290 as optical reference targets. Similar to the way the outer edges and/or corners of the overall heliostat may be identified (as described above with regard to locating images and FIG. 2) feature recognition or detection of edges, corners, or other identifiable points on the individual facets may also be identified. For example, using optical sensors and image analysis (e.g., computer vision) edges and/or corners of facets may be identified in images. By identifying and thus locating edges or corners along the top edge of at least a single row of facets, variances to the surface normal of the assessed heliostat 290 may be reduced and/or eliminated. The analysis of the identified points may be used to produce 3D estimates of the heliostat shape and location. Similarly, the analysis may be used to produce 3D estimates of the shape and location of individual facets of the assessed heliostat. Such estimates may be used to assess the heliostats and/or the facets thereof for damage or unwanted changes (e.g., cracking or degradation). In addition, the identification of points may be used to determine a true shape and/or location of the optical reference targets to estimate surface normals at identified mirror locations.

In accordance with various embodiments, one or more features of the reference heliostat 390 are identifiable in the reflection. The one or more features may correspond to points on the assessed heliostat that correspond to identifiable features from the reference heliostat that are visible in the reflection. For example, an edge or corner of a facet or another element on the reference heliostat may be considered a feature of the reference heliostat. In particular, the one or more features may include pairs of corners that are identifiable as points 411*a*, 411*b*, 412*a*, 412*b*, 413*a*, 413*b*, 414*a*, 414*b*, 415*a*, 415*b* on each of the facets in the top row of facets from the reference heliostat 390. In FIGS. 4A-4D, the points 411*a*, 411*b*, 412*a*, 412*b*, 413*a*, 413*b*, 414*a*, 414*b*, 415*a*, 415*b* are emphasized, to assist in the visualization of their location, by reference markers in the form of small circles with a cross hatch fill. Otherwise, the corners, edges, or other points on the facets and/or heliostats of the embodiments herein do not actually need to have reference markers thereon. Those pairs of points used as features of the reference heliostat 390 include, from left to right, a first pair of points 411*a*, 411*b* on a first facet, a second pair of points 412*a*, 412*b* on a second facet, a third pair of points 413*a*, 413*b* on a third facet, a fourth pair of points 414*a*, 414*b* on a fourth facet, and a fifth pair of points 415*a*, 415*b* on a fifth facet. By identifying a location of the pairs of points 411*a*, 411*b*, 412*a*, 412*b*, 413*a*, 413*b*, 414*a*, 414*b*, 415*a*, 415*b* on each of the facets, a calculated surface normal may be determined for each corresponding facet.

By identifying a corner of a reference facet, two-dimensional constraint information may be obtained, which may be used to compute the facet surface normal at that point. For example, consider point 414*b* in FIG. 4A, which is a point on the assessed heliostat 290 that corresponds by reflection to a corner on the reference heliostat 390. A vector $\overrightarrow{UA}$ may be constructed from the UAV camera position to the point 414*b* on the assessed heliostat, and a second vector $\overrightarrow{AR}$ from the point 414*b* on the assessed heliostat to the corresponding corner on the reference heliostat. These vectors indicate the reflection situation. Vector $\overrightarrow{UA}$ points toward the assessed heliostat, and vector $\overrightarrow{AR}$ points away from the assessed heliostat. Reversing the direction of vector $\overrightarrow{UA}$ provides an opposite vector $\overrightarrow{AU}$ ($\overrightarrow{AU}=-\overrightarrow{UA}$) that points away from the assessed heliostat. The surface normal at point 414*b* corresponds to a vector that bisects the angle between vectors $\overrightarrow{AU}$ and $\overrightarrow{AR}$. One method of computing the surface normal is to normalize $\overrightarrow{AU}$ and $\overrightarrow{AR}$ to unit length, forming $\widehat{au}$ and $\widehat{ar}$, respectively, and then compute the estimated surface normal as $\hat{n}=|\widehat{au}+\widehat{ar}|$, where "+" denotes vector addition, and "|V|" denotes computing the normalized unit vector aligned with vector V. Thus, the point 414*b* may have a calculated surface normal $\hat{n}$ denoted as $\widehat{n_{414b}}$.

The calculated surface normal $\widehat{n_{414b}}$ may be compared to a presumed surface normal of the assessed heliostat at point 414*b*. If the comparison yields a surface normal variance (i.e., a difference between the presumed surface normal and the calculated surface normal), this would indicate an error in the facet surface. This process may be repeated for a plurality of points on the assessed heliostat (e.g., 411*b*, 412*a*, 412*b*, 413*a*, 413*b*, 414*a*, 414*b*, 415*a*, 415*b* in FIGS. 4A-6). This repeated process produces a plurality of calculated surface normals. These are then considered in combination using various techniques familiar to one skilled in the art, such as averaging, to determine whether adjustments and/or corrections are needed for the assessed heliostat.

Obtaining two-dimensional constraint information may eliminate the need to do lateral scans (e.g., left-to-right series 301), in addition to a top-to-bottom or bottom-to-top scan. Additionally, two-dimensional constraint information may enable the identification and correction of heliostat and/or facet positioning/orientation errors without requiring a detailed model of all heliostat field positions, which are often not known or are uncertain. Also, an advantage of identifying and using the facet corners as optical reference targets is that such corners are extremely common at CSP plants worldwide, eliminating or at least reducing the need to program new image processing code for each new CSP plant.

In FIG. 4A, the image 400 shows the assessed heliostat 290 and the back surface of a top row of facets, from a reference heliostat 390, that are visible in a reflection on parts of the bottom row of facets of the assessed heliostat 290.

In FIG. 4B, the image 401 shows the assessed heliostat 290 and the back surface of a top row of facets from the reference heliostat 390 now visible in a reflection on the third row of facets of the assessed heliostat 290. Additionally, more facet rows from the reference heliostat 390 are visible on the lower rows of facets of the assessed heliostat 290.

In FIG. 4C, the image 402 shows the assessed heliostat 290 and the back surface of a top row of facets from the reference heliostat 390 now visible in a reflection on the fourth row (from the bottom) of facets of the assessed heliostat 290. Additionally, even more facet rows from the reference heliostat 390 are visible on the lower rows of facets of the assessed heliostat 290.

In FIG. 4D, the image 403 shows the assessed heliostat 290 and the back surface of a top row of facets from the reference heliostat 390 now visible in a reflection on the fifth row (from the bottom) of facets of the assessed heliostat 290. Additionally, all the facet rows from the reference heliostat 390 are visible on the lower rows of facets of the assessed heliostat 290.

Alternatively, a single point on an edge, such as a top edge of each facet (i.e., one peripheral point) from the adjacent heliostat may be identified on a facet of an assessed heliostat. Using only an edge provides only one-dimensional constraint information about that facet. Thus, detecting a top edge alone, while providing information about the vertical location of the respective facet, does not include information about a horizontal location of that facet. Accordingly, detecting at least two edges, and preferably two corners, on each of the plurality of facets may provide more accurate information about the location in space and orientation of a facet.

Some heliostat fields may include heliostats with facets that have very small or almost no gap between adjacent facets. Such small or non-existent gaps may require higher resolution imaging for the computerized image analysis to detect more reliably the at least two edges, or preferably two corners, of each facet that provide both vertical and horizontal location for those facets. Such higher resolution imaging may be addressed by the selection of a suitable digital camera and lens combination.

Optionally, two points on two edges of the reference heliostat visible in the reflection (e.g., the adjacent heliostat) may be used to estimate the location of the top corners of the facets of that reference heliostat. Known dimension of the reference heliostat may be used to guide the computerized image analysis in determining a location of target features of the reference heliostat (i.e., optical reference targets).

Figure 5:
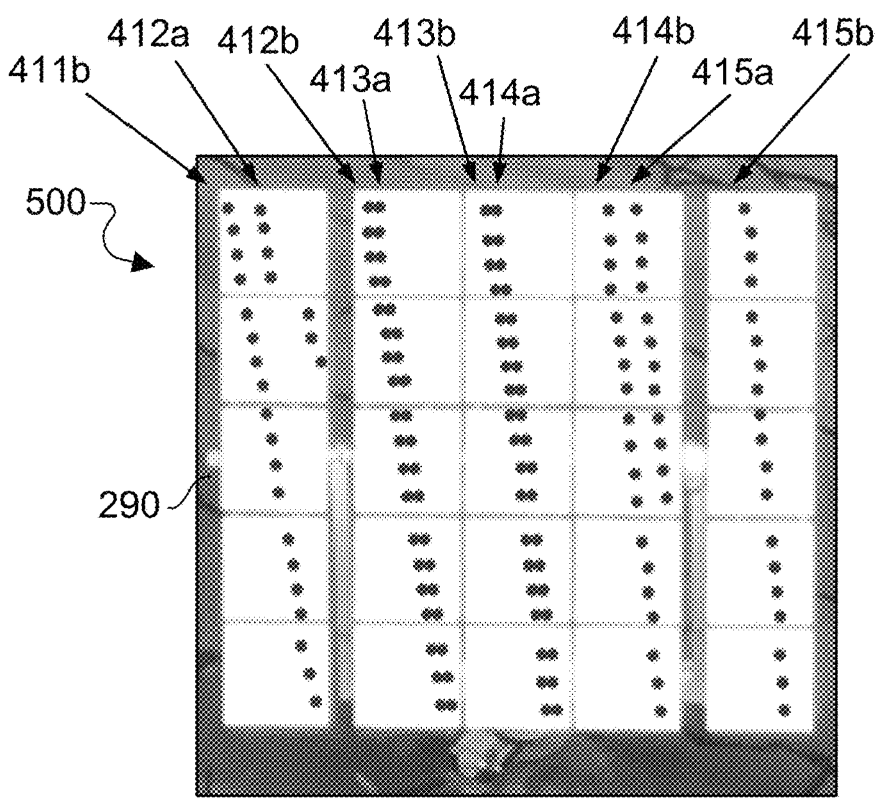
FIG. 5 is a composite view of locations of detected optical reference targets on an assessed heliostat according to various embodiments.

FIG. 5 illustrates a composite view 500 of the locations of detected optical reference targets (e.g., 411*b*, 412*a*, 412*b*, 413*a*, 413*b*, 414*a*, 414*b*, 415*a*, 415*b*) on the assessed heliostat from multiple sequential measuring images (e.g., images 100-111 in FIG. 3A and additional intermediate images not included in FIG. 3A for ease of explanation). The composite view 500 demonstrates how the reference facet points, used as optical reference targets, appear to move across the reflective surfaces (i.e., the facets) of the assessed heliostat when viewed across multiple images. Similar to how the reflection of the top edge of the reference heliostat appeared to sweep from bottom to top across the reflective facets of the assessed heliostat, the optical reference targets also appear to sweep across the assessed heliostat. Thus, in FIG. 5 the compilation of optical reference targets collected from sequential measuring images appear as diagonal columns of dots (or dotted lines). Each of the columns of dots is denoted by reference numerals in parentheses to reflect that each of the dots in that column correspond to the same optical reference target, with the position of each row of dots taken from a different measuring image. In the case of the composite view 500, columns of dots drift horizontally as they move vertically, which reflects that the predetermined flight path of the drone taking the measuring images had a slight lateral shift as it crossed the assessed heliostat 290.

The vertical spacing of the optical reference targets (i.e., the dots) in the composite view 500 reflects the frequency with which measuring images were captured, as well as the speed of the UAV (e.g., 150) as it was capturing them. Thus, if the UAV captured images at a higher frequency or flew at a lower speed, the vertical spacing between optical reference targets may be reduced. A much higher frequency and/or much slower UAV speed may make the column of dots appear as a solid line. Alternatively, the vertical spacing between optical reference targets may be increased by decreasing the frequency at which the measuring images are taken and/or increasing the speed of the UAV.

Figure 6:
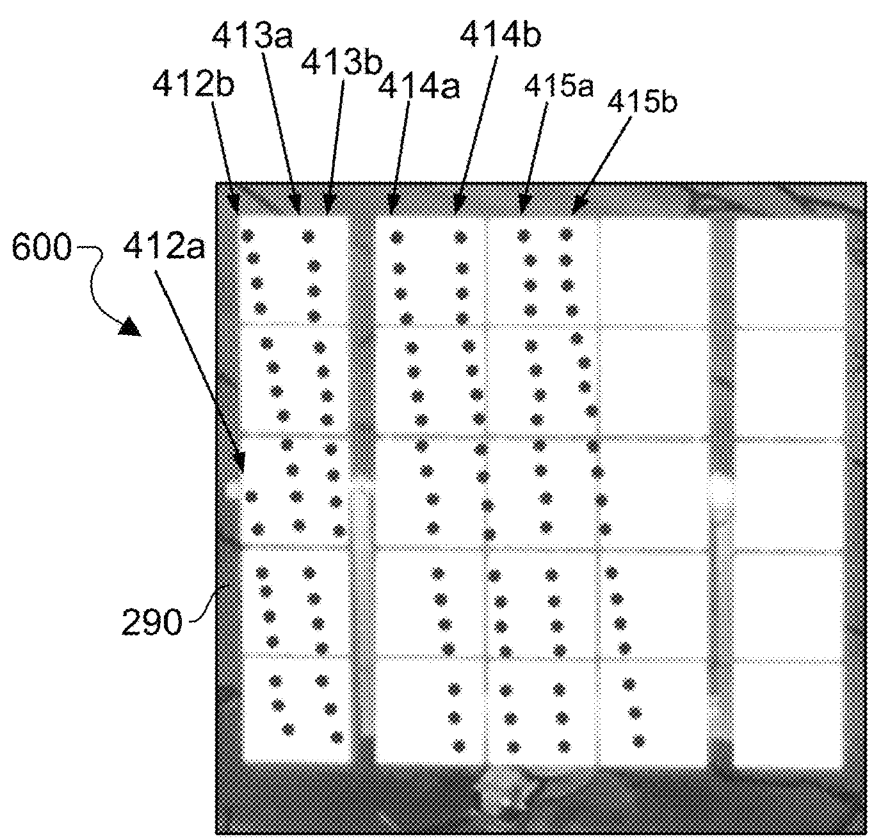
FIG. 6 is a composite distorted view of locations of detected optical reference targets on an assessed heliostat according to various embodiments.

FIG. 6 illustrates a composite view 600 compiled from measuring images captured a decreased distance from the assessed heliostat 290. In particular, the measuring images were captured significantly closer to the assessed heliostat 290 as compared to the measuring images used for the composite view 500 in FIG. 5. The compression of the lateral spacing of optical reference targets may occur because the reflected images of the reference heliostat become smaller as the distance from the camera to the assessed heliostat decreases. For a given heliostat pair (i.e., the assessed heliostat and the reference heliostat) with a fixed heliostat-to-heliostat distance, the measurement sensitivity and apparent distortion may vary as a function of camera-to-mirror distance. A desire to limit distortion in imaging may encourage the selection of smaller camera-to-mirror distances, particularly when using low resolution imaging (e.g., from low camera quality).

For heliostats on the peripheral edges of the heliostat field (i.e., no neighboring heliostats in one lateral direction) this observed optical reference target compression leaves part of the assessed heliostat unscanned. For example, in FIG. 6, the right side of the assessed heliostat 290 contains no optical reference targets for assessing those corresponding empty facets (i.e., facets with no optical reference targets). These areas may be measured with one or more additional passes of the UAV from a different direction, or when the heliostats are in a different orientation.

Figure 7A:
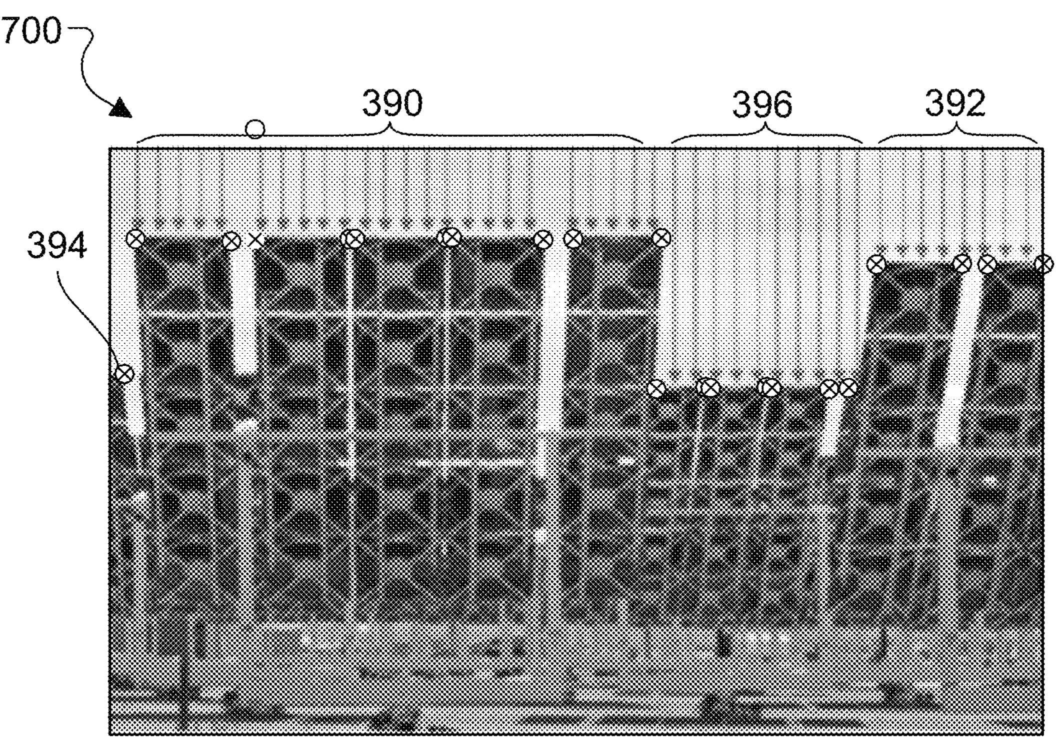
FIG. 7A is a backside view of a wide horizon of reference heliostats according to various embodiments.

FIG. 7A illustrates an example of a backside view 700 of more densely populated section of a heliostat field (e.g., 90). The backside view 700 includes a wide "horizon" of reference heliostats 390, 392, 394, 396 that may be used for assessing heliostats in rows behind them (i.e., toward the foreground of the view). As shown, the wide horizon may include reference heliostats from more than one row. As shown in FIG. 7A, the main reference heliostat 390 and a laterally adjacent heliostat 392 from the same row are visible. In addition, two other reference heliostats 394, 396 from another row are visible in the background. In heliostat fields that provide these types of wide horizons, long distance imaging (e.g., composite view 600 in FIG. 6) collecting using sufficiently high resolution may include more optical reference targets per image. Additional optical reference targets may provide greater accuracy for assessing and adjusting assessed heliostats.

The backside view 700 shows that the backs of the facets of the reference heliostats may have numerous identifiable features, which may be used as optical reference targets, in addition to those denoting the facet edges. However, such identifiable features may not be universal to other heliostats in other heliostat fields. Thus, systems and methods that use facet edges as optical reference targets may be applied more universally to different heliostat fields.

Figure 7B:
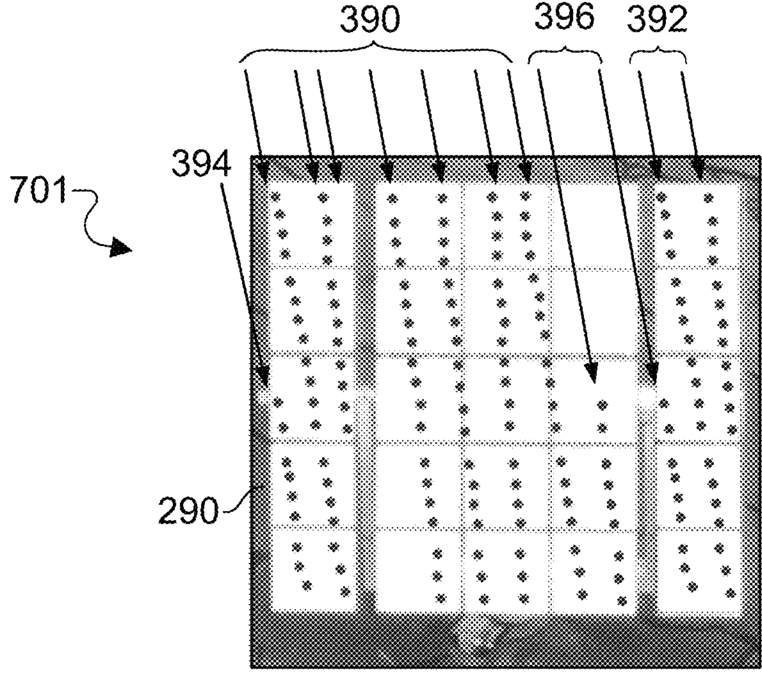
FIG. 7B is a composite distorted view of locations of detected optical reference targets on an assessed heliostat with the wide horizon of reference heliostats in FIG. 7A visible thereon, according to various embodiments.
Figures 8A, 8B, 8C, 8D:
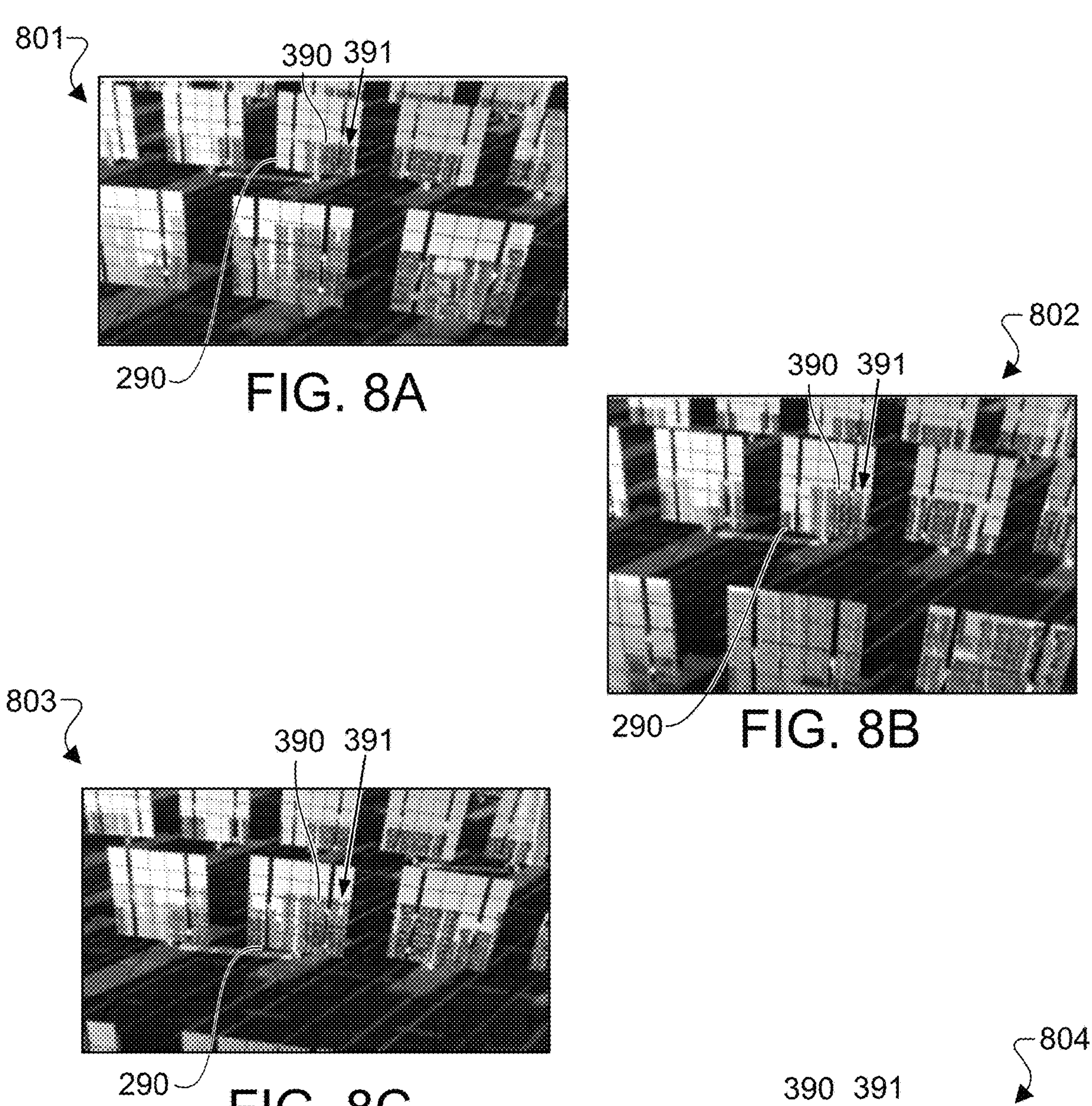
FIGS. 8A-8D show a series of measuring images with high contrast between heliostats in the heliostat field according to various embodiments.

FIG. 7B illustrates a composite view 701 compiled from long-distance measuring images of an assessed heliostat 290 and a wide horizon of reference heliostats 390, 392, 394, 396, in accordance with various embodiments. The columns of optical reference targets from the reference heliostats 390, 392, 394, 396 are somewhat distorted and compressed, but provide many more points of reference for calibration and assessment of the assessed heliostat 290.

In some embodiments, the point density of optical reference targets may be further increased by performing additional UAV scans, and then combining the resulting measuring images into a multi-pass composite view.

In alternative embodiments, fiducial marks may be built into the reference facets or added to the reference facets after manufacture or installation. The fiducial marks, which may be more easily identified in measuring images, may provide optical reference targets that increase accuracy and efficiency. As a further alternative, or additionally, retroflectors may be built into the reference facets or added to the reference facets after manufacture or installation. Similar to the fiducial marks, retroflectors may provide optical reference targets that increase accuracy and efficiency.

FIGS. 8A-8D illustrate a sequence of measuring images 801, 802, 803, 804 with high contrast between heliostats. The measuring images 801, 802, 803, 804 may have been captured from a UAV (e.g., 150) in a way that causes an optical reference horizon 391 to appear to sweep upward across an assessed heliostat 290, while the assessed heliostat 290 sequentially shifts downward across the measuring images 801, 802, 803, 804. The optical reference horizon 391 is a linear reference feature representing the top edge of the reference heliostat visible in the reflection on the facets of the assessed heliostat 290. For example, in the first measuring image 801, the optical reference horizon 391 is located at the bottom of the third row of assessed facets from the top. In the second measuring image 802, the optical reference horizon 391 is located in the middle of the third row of assessed facets from the top. In the third measuring image 803, the optical reference horizon 391 is located at the bottom of the second row of assessed facets from the top. In the fourth measuring image 804, the optical reference horizon 391 is located at the bottom of the first row of assessed facets from the top.

While FIGS. 8A-8D only demonstrate a few measuring images 801, 802, 803, 804 from a video scan collected at 30 Hz, the full video from a UAV flyby may capture many more intermediate images than what is illustrated here.

The measuring images 801, 802, 803, 804 exploit the ensemble of upright heliostats to demonstrate an optical reference horizon that may provide a full-width constraint for most heliostats observed in the scan. Using such full-width constraints may enable the reduction of the camera-to-mirror distance, which is advantageous. For example, the advantages may include (a) increasing sensitivity, (b) reducing distortion, and (c) increasing sample point density, all while efficiently scanning the full mirror width.

Various embodiments take advantage of the ground, neighboring equipment/structures, and/or other contrasting elements as a background. Contrasting background elements may provide better contrast for image recognition from computer vision techniques. Such high contrast may enable subsequent computations to use the easily identified assessed heliostat boundaries and the smooth motion of the predetermined flight path to track the assessed heliostat's edges forward and backward in the image sequence.

While FIGS. 4A-4D and 8A-8D illustrate a sequence of measuring images collected as part of a forward-to-back flight path of the UAV (i.e., flying toward the mirrored side of the facets of the heliostats), the UAV may also fly backwards along a similar flight path, producing an equivalent sequence of images where time is reversed. In some embodiments, where the image sequence is processed after the UAV flight, forward-to-back and back-to-forward UAV flights may be considered equivalent, since the image processing can analyze the images either in forward time order, or reverse order.

Figure 9:
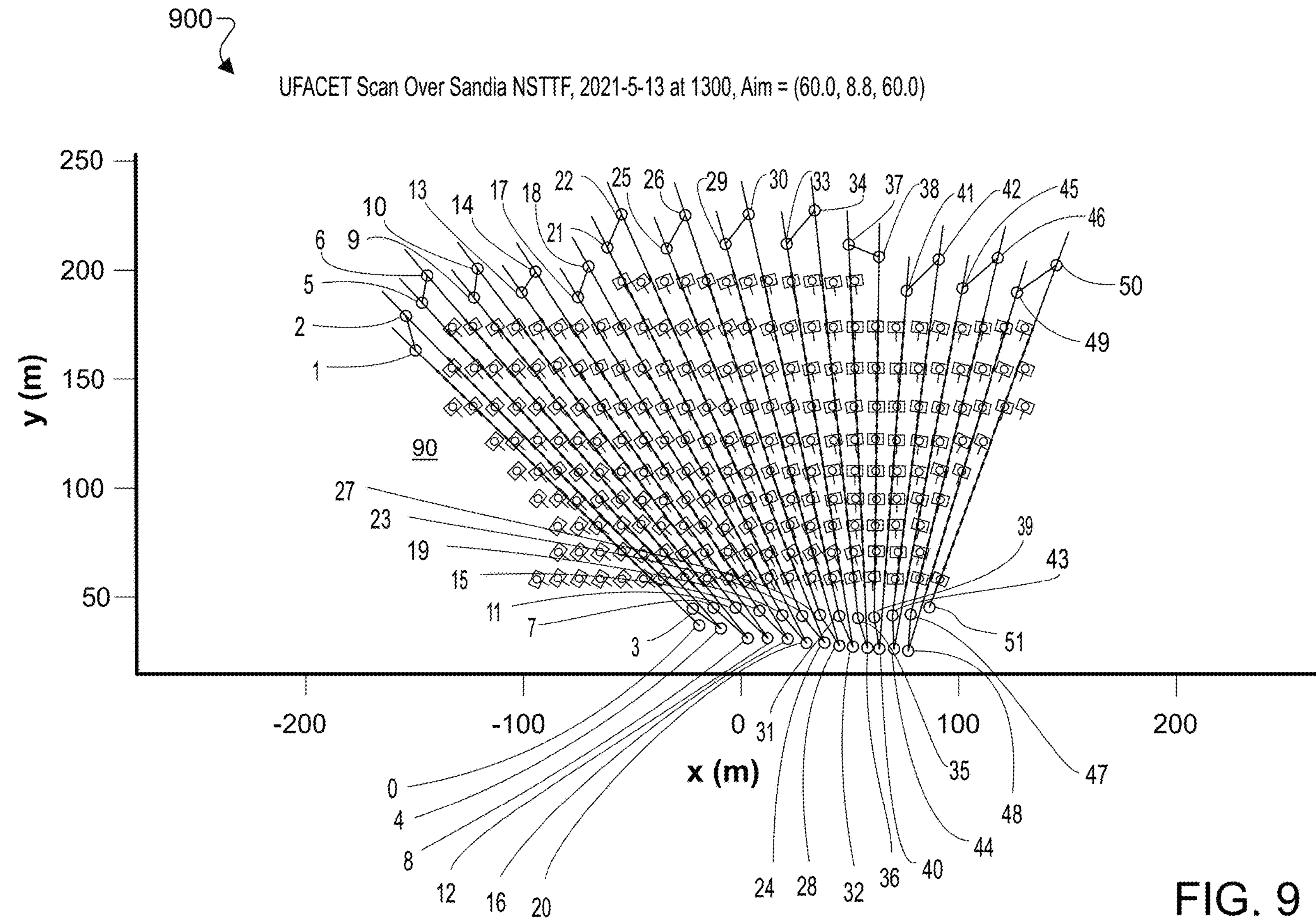
FIG. 9 is a graphical plot of a predetermined flight path according to various embodiments.

FIG. 9 illustrates a plotted top view of a predetermined flight path 900 for a UAV across a heliostat field 90 in accordance with various embodiments. FIG. 9 shows a series of straight line passes by the UAV, with an index spacing/angle between them. In various embodiments, a flight plan may be generated ahead of time (i.e., a predetermined flight plan) that commands the UAV to fly a scanning flight over heliostats of interest, through a series of locations with associated camera gaze angles that will capture the desired "edge scan" reflection sequence. By following the predetermined flight plan, the UAV may fly the given flight plan, capturing images and/or video data. The predetermined flight path 900 traverses across a row of heliostats, shifts to an adjacent row after traversing an entire row, then traverses across the neighboring row of heliostats in the opposite direction. The predetermined flight path 900 may have the UAV fly first forward, then backward along alternating rows of heliostats, while maintaining approximately the same speed, and a constant heading across each row. In this case, the imaging sensor gaze direction may alternate between looking forward and looking backward. In this way, the UAV may follow a continuous serpentine pattern that scans all or almost all the heliostats in the heliostat field 90. In FIG. 9, the heliostat field 90 extends away from a bottom of the heliostat field 90 in a fanned out pattern, with the rows wider apart at the top of the heliostat field 90 (reference to bottom and top are to the orientation shown in FIG. 9). A full field scan such as the example shown in FIG. 9 may capture more than 18,000 images. Such a large quantity of images may need to be processed efficiently to achieve an overall efficient system.

Alternatively, a predetermined flight path may have the UAV always fly forward, executing smooth transition motions between passes, much like a crop-dusting aircraft flying over a corn field. In this case, the imaging sensor need not change gaze direction. This technique may enable the use of fixed-wing UAVs, which could collect data at higher speeds and for longer periods, significantly increasing productivity.

In various embodiments, the predetermined flight path is preferably smooth and fast. This facilitates efficient flight for both rotorcraft and fixed-wing UAVs, increasing endurance and allowing more heliostats to be measured within a single flight. In this way, the portions of the predetermined flight path that pass over a series of heliostats may have the UAV travel at a constant elevation, constant speed, constant heading/trajectory, and may use a constant gaze angle for the imaging sensors (e.g., the camera) at least with each pass.

In some embodiments, a consideration that may be used to determine the predetermined flight path may include avoiding solar flux, which may result from the concentrated thermal energy generated by the heliostat field 90. Solar flux may damage the UAV, damage onboard equipment (e.g., the cameras, processors, etc.), and/or cause the UAV to lose control. Solar flux may be more intense at higher altitudes (i.e., closer to the solar receiver) due to the higher concentration of solar power aimed at the solar receiver. As a rule of thumb, the intensity of sunlight rises with the square of the altitude, particularly with increased proximity to the solar receiver. Losing control may cause the UAV to crash into the ground or one or more heliostats. Thus, safety of the UAV may be accounted for in determining the predetermined flight path, particularly over an active heliostat field 90. In considering safety, the level of solar flux a particular UAV may absorb without being significantly damaged or losing control may be considered.

The UAV camera gaze angle may be controlled in several ways. In one embodiment, the UAV redirects its optical sensor from one heliostat to the next as it proceeds along the pass. In another embodiment, the UAV may maintain a constant gaze angle along the entirety of each pass. In another embodiment, the UAV gradually changes its gaze angle from an initial gaze angle to a final gaze angle as it proceeds along the pass. For passes spanning a large number of heliostats in a large heliostat field, a changing gaze angle may improve performance. The speed of the UAV may be chosen so that the desired optical reference target density is captured, given the UAV video frame rate. For example, with a flight speed of 5.2 m/sec, or 11.5 miles per hour, the UAV may gather images for all 9 heliostats in just over 25 seconds, or less than 3 seconds per heliostat.

Figure 10:
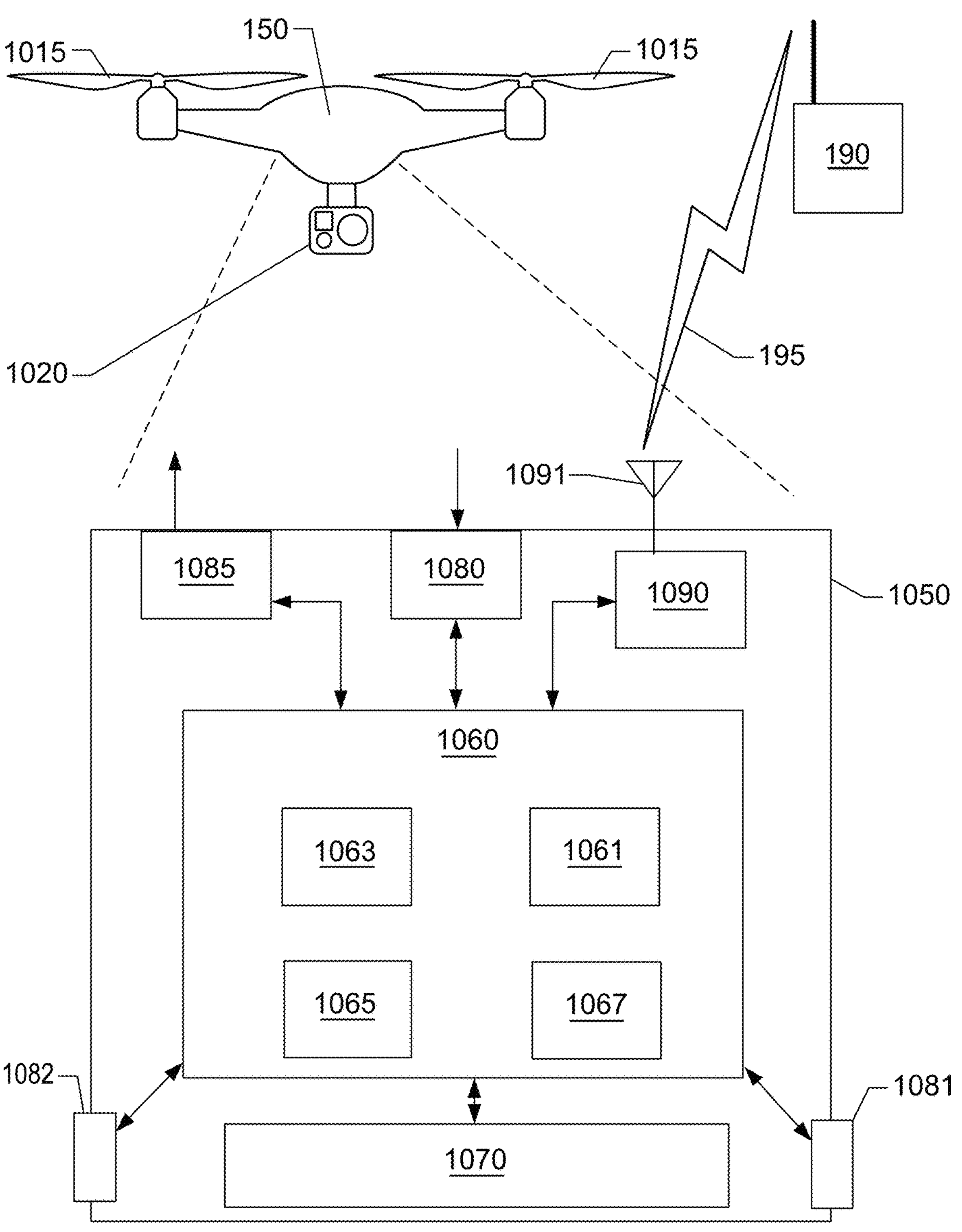
FIG. 10 is system diagram of a UAV suitable for use with various embodiments.

FIG. 10 illustrates a configuration of the UAV 150 that may be used for any of the UAVs in various embodiments. With reference to FIGS. 1-10, the UAV 150 may include a control unit 1050 that may house various circuits and devices used to power and control the operation of the UAV 150. The control unit 1050 may include a processor 1060, a power module 1070, an input module 1080, an image sensor 1081, other sensors 1082, an output module 1085, and a radio module 1090 coupled to an antenna 1091. The processor 1060 may include or be coupled to memory 1061 and a navigation unit 1063. The processor 1060 may be configured with processor-executable instructions to control flight and other operations of the UAV 150, including operations of the various embodiments. The processor 1060 may be coupled to one or more image sensors 1081 and other sensors 1082.

The image sensor 1081 may include one or more image capturing devices for photographing the assessed heliostats (e.g., 290). More than one image capturing device may be configured to contemporaneously capture multiple different images including an assessed heliostat. Alternatively, the image sensor 1081 may be configured to detect light in the infrared spectrum for thermal imaging.

The other sensors 1082 may be optical sensors (e.g., light meters for controlling exposure and determining whether additional illumination is required), radio sensors, a rotary encoder, pressure sensors (i.e., for detecting wind, lift, drag, or changes therein) or other sensors.

The power module 1070 may include one or more batteries that may provide power to various components, including the processor 1060, the input module 1080, the image sensor 1081, the other sensors 1082, the output module 1085, and the radio module 1090. In addition, the power module 1070 may include energy storage components, such as rechargeable batteries. The processor 1060 may be coupled to an output module 1085, which may output control signals for managing the motors that drive the rotors 1015 and other components.

Through control of the individual motors of the rotors 1015, the UAV 150 may be controlled in flight, such as on a predetermined flight path (e.g., 155). The processor 1060 may receive data from the navigation unit 1063 and use such data in order to determine the present position and orientation of the UAV 150, as well as the appropriate course along the predetermined flight path (e.g., 155). In various embodiments, the navigation unit 1063 may include a global navigation satellite system (GNSS) receiver system (e.g., one or more Global Positioning System (GPS) receivers) enabling the UAV 150 to navigate using GNSS signals. Alternatively, or in addition, the navigation unit 1063 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network sites, radio station, remote computing devices, other UAVs, etc.

The processor 1060 and/or the navigation unit 1063 may be configured to communicate with a server through a wireless connection (e.g., a cellular data network) to receive commands to use or stop using the extended flight protocol, receive data useful in navigation, provide real-time position altitude reports, and assess data. An avionics module 1067 coupled to the processor 1060 and/or the navigation unit 1063 may be configured to provide flight control-related information such as altitude, attitude, airspeed, heading and similar information that the navigation unit 1063 may use for navigation purposes, such as dead reckoning between GNSS position updates. The avionics module 1067 may include or receive data from a gyro/accelerometer unit 1065 that provides data regarding the orientation and accelerations of the UAV 150 that may be used in navigation and positioning calculations.

The radio module 1090 may be configured to receive signals via the antenna 1091, such as command signals, receive signals from aviation navigation facilities, etc., and provide such signals to the processor 1060 and/or the navigation unit 1063 to assist in operation of the UAV 150. In some embodiments, commands for controlling the UAV 150 or components thereof may be received via the radio module 1090. In some embodiments, the UAV 150 may receive signals from the computing device 190 (e.g., a wireless control unit). For example, the wireless link 195 may include input from a knowledge base regarding current conditions, current setting of the heliostats (e.g., 90), a current orientation of the UAV 150 or elements thereof, predicted future conditions, requirements for particular UAV flight paths, aiming parameters of the camera or even information regarding an assessed and/or reference heliostat (e.g., 290, 390).

In various embodiments, the radio module 1090 may be configured to switch between a cellular connection and a Wi-Fi or other form of radio connection depending on the location and altitude of the UAV 150. For example, while in flight at an altitude designated for UAV traffic, the radio module 1090 may communicate with a cellular infrastructure in order to maintain communications with a server. In addition, communications with the computing device 190 may be established using cellular telephone networks while the UAV 150 is flying out of line-of-sight with an operator. Communication between the radio module 1090 and the wireless link 195 may transition to a short-range communication link (e.g., Wi-Fi or Bluetooth) when the UAV 150 moves closer to the computing device 190. Similarly, the UAV 150 may include and employ other forms of radio communication, such as mesh connections with other UAVs or connections to other information sources (e.g., balloons or other stations for collecting and/or distributing weather or other data harvesting information).

In various embodiments, the control unit 1050 may be equipped with the input module 1080, which may be used for a variety of applications. For example, the input module 1080 may receive and pre-process images or data from an onboard image sensor 1081 or another sensor 1082. Also, the input module may receive electronic signals from other components (e.g., a remote computing device and/or solar tower). The input module 1080 may receive an activation signal for causing actuators on the UAV 150 to deploy landing cushions or similar components for affecting an emergency landing. In addition, the output module 1085 may be used to activate components (e.g., an image sensor, one or more other sensors, an energy cell, an actuator, an indicator, a circuit element, and/or an energy-harvesting element).

While the various components of the control unit 1050 are illustrated in FIG. 10 as separate components, some or all of the components (e.g., the processor 1060, the output module 1085, the radio module 1090, and other units) may be integrated together in a single device or module, such as a system-on-chip module.

The processors implementing various embodiments may be any programmable microprocessor, microcomputer or multiple processor chip or chips that can be configured by software instructions (applications) to perform a variety of functions, including the functions of the various embodiments described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

Figure 11A:
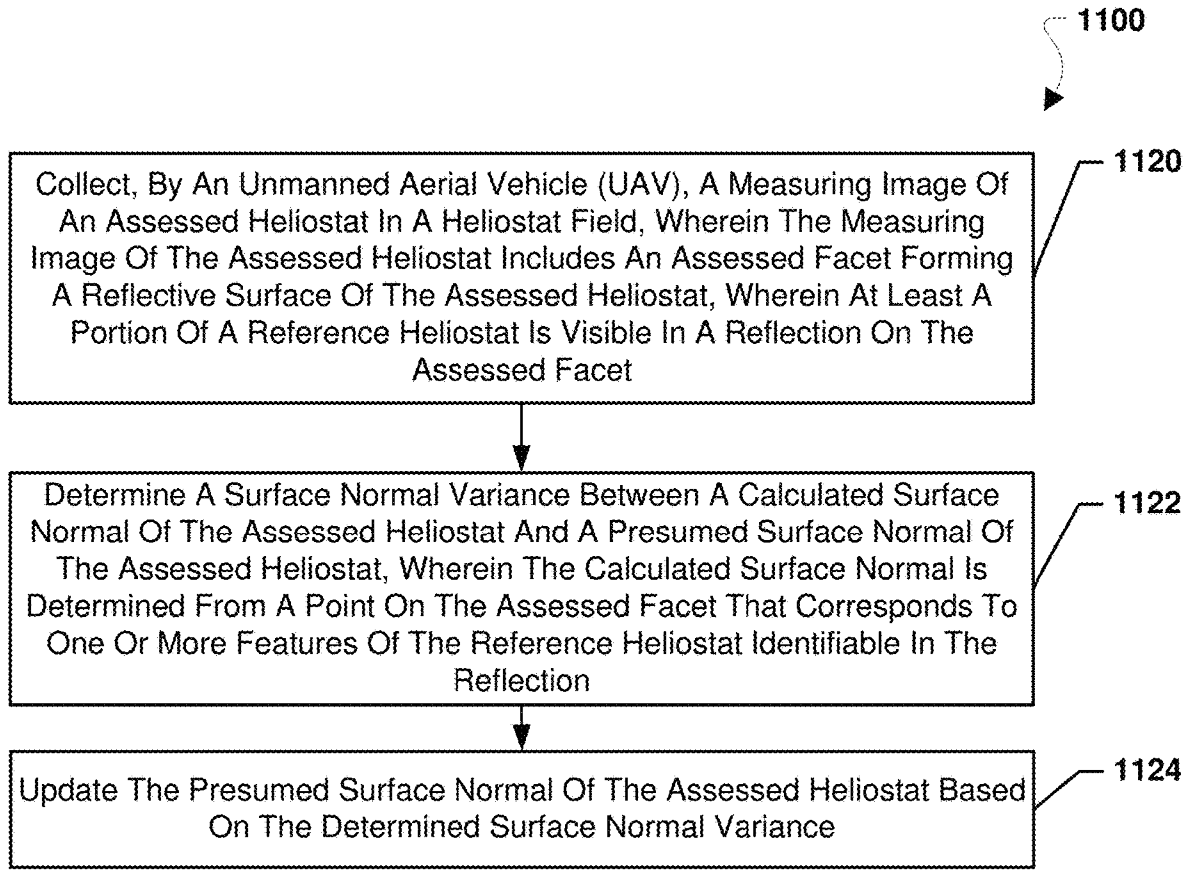
FIGS. 11A-11B are process flow diagrams each illustrating a method for performing heliostat optical alignment according to various embodiments.

FIG. 11A illustrates a method 1100 for performing heliostat optical alignment according to various embodiments. With reference to FIGS. 1A-11A, operations of the method 1100 may be performed by a UAV (e.g., 150 in FIG. 10), a control unit (e.g., 1050 in FIG. 10), a remote computing device (e.g., 190 in FIGS. 1A and 1B) and/or another computing device in communication with the UAV.

In block 1120, the UAV (e.g., controlled by the processor 1060 in the control unit 1050 or a processor in remote computing device 190) may collect a measuring image (e.g., 100 in FIGS. 2, 3A, 3B, 4A-4D, 8A-8D) of an assessed heliostat (e.g., 290 in FIGS. 2, 3A, 3B, 4A-4D, 8A-8D) in a heliostat field (e.g., 90 in FIGS. 1A-1C). The measuring image of the assessed heliostat may include an assessed facet forming a reflective surface of the assessed heliostat. At least a portion of a reference heliostat is visible in a reflection on the assessed facet. The assessed heliostat may include multiple facets that form a plurality of reflective surfaces of the assessed heliostat. The portion of the reference heliostat may be visible in the reflection from multiple facets.

In some embodiments, the measuring image may be collected by the UAV while traversing along a predetermined flight path. The UAV may traverse the predetermined flight path over the assessed heliostat with a characteristic selected from at least one of a constant heading, a constant speed, or a constant gaze angle of an imaging sensor used to collect the measuring image. In some embodiments, the characteristic may include a constant heading. In some embodiments, the predetermined flight path may pass the assessed heliostat from one of a front-to-back direction or a back-to-front direction of the assessed heliostat. In some embodiments, the predetermined flight path may pass the assessed heliostat in a direction with a lateral component. The lateral component may traverse laterally relative to the assessed heliostat. In some embodiments, the predetermined flight path may pass the assessed heliostat in a lateral direction relative to the assessed heliostat. In some embodiment, the calculated surface normal may be determined from a plurality of points on the assessed facet. In some embodiment, the calculated surface normal may be determined from a plurality of points on the assessed heliostat. For example, the assessed heliostat may have a plurality of facets, with points from numerous facets used to calculate the surface normal of the assessed heliostat. The calculated surface normal may be determined from an average of calculated surface normal for a facet, an average of all the facets, or an average across the entire heliostat.

In block 1122, a surface normal variance may be determined between a calculated surface normal of the assessed heliostat and a presumed surface normal of the assessed heliostat. The calculated surface normal may be determined from points on the plurality of assessed facets that correspond to one or more features of the reference heliostat identifiable in the reflection.

In some embodiments, the one or more features of the reference heliostat identifiable in the reflection, which may be used to determine the calculated surface normal, may correspond to edges of reference facets of the reference heliostat. The edges of the reference facets may correspond to upper edges on the reference facets in a top row of the reference facets on the reference heliostat. In some other embodiments, the one or more features of the reference heliostat identifiable in the reflection, which may be used to determine the calculated surface normal, may correspond to other points on the reference facets of the reference heliostat. The points on the reference facets may correspond to upper corners on the reference facets in a top row of the reference facets on the reference heliostat. In some embodiments, the one or more features of the reference heliostat identifiable in the reflection, may be used to determine the calculated surface normal, which may correspond to fiducial marks located on the reference facets.

In block 1124, a processor may update the presumed surface normal of the assessed heliostat based on the determined surface normal variance. Such updating of the presumed surface normal may correct the slope, canting, and/or tracking errors of an assessed heliostat. In this way, the assessed heliostat may be better aligned with the solar receiver. The operations in the method 1100 may be repeated by the UAV, control unit, remote computing device, and/or another computing device until the assessed heliostat is fully assessed and/or until all or a part of the heliostat field is fully assessed.

Figure 11B:
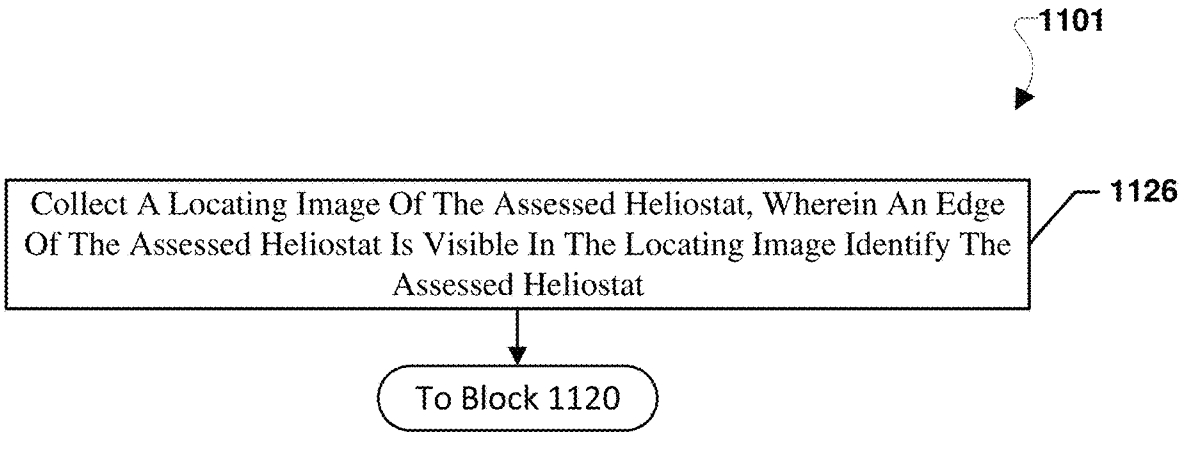

FIG. 11B illustrates a method 1101 for performing heliostat optical alignment according to various embodiments. With reference to FIGS. 1A-11B, operations of the method 1101 may be performed by the UAV (e.g., 150 in FIG. 10), the control unit (e.g., 1050 in FIG. 10), the remote computing device (e.g., 190 in FIGS. 1A and 1B) and/or another computing device in communication with the UAV.

In block 1126, the UAV (e.g., controlled by the processor 1060 in the control unit 1050 or a processor in remote computing device 190), the control unit, the remote computing device, and/or another computer may collect a locating image of the assessed heliostat. Edges of the assessed heliostat may be visible in the locating image identifying the assessed heliostat. In some embodiments, the locating image does not contain the reflection of the reference heliostat.

Following the operations in block 1126, the UAV, the control unit, the remote computing device, and/or another computer may perform the operations in block 1120 of the method 1100 as described.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods and operations 1100 and 1101 may be substituted for or combined with one or more operations of the methods 1100 and 1101, and vice versa.

Implementation examples are described in the following paragraphs. While some of the following implementation examples are described in terms of example methods, further example implementations may include: the example methods discussed in the following paragraphs implemented by a computing device comprising a processor configured with processor-executable instructions to perform operations of the methods of the following implementation examples; the example methods discussed in the following paragraphs implemented by a computing device comprising means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method for performing heliostat optical alignment, comprising collecting, by an unmanned aerial vehicle (UAV), a measuring image of an assessed heliostat in a heliostat field, wherein the measuring image of the assessed heliostat includes an assessed facet forming a reflective surface of the assessed heliostat, wherein at least a portion of a reference heliostat visible in a reflection on the assessed facet; determining a surface normal variance between a calculated surface normal of the assessed heliostat and a presumed surface normal of the assessed heliostat, wherein the calculated surface normal is determined from a point on the assessed facet that corresponds to one or more features of the reference heliostat identifiable in the reflection; and updating the presumed surface normal of the assessed heliostat based on the determined surface normal variance.

Example 2. The method of example 1, wherein the measuring image is collected by the UAV while traversing along a predetermined flight path, wherein the UAV traverses the predetermined flight path over the assessed heliostat with a characteristic selected from at least one of a constant heading, a constant speed, or a constant gaze angle of an imaging sensor used to collect the measuring image.

Example 3. The method of example 2, wherein the predetermined flight path passes the assessed heliostat from one of a front-to-back direction or a back-to-front direction of the assessed heliostat.

Example 4. The method of example 2, wherein the predetermined flight path passes the assessed heliostat in a direction with a lateral component, wherein the lateral component traverses laterally relative to the assessed heliostat.

Example 5. The method of example 2, wherein the predetermined flight path passes the assessed heliostat in a lateral direction relative to the assessed heliostat.

Example 6. The method of example 1, further comprising collecting a locating image of the assessed heliostat, wherein an edge of the assessed heliostat visible in the locating image identifies the assessed heliostat.

Example 7. The method of example 6, wherein the locating image does not contain the reflection of the reference heliostat.

Example 8. The method of example 1, wherein the one or more features of the reference heliostat identifiable in the reflection, used to determine the calculated surface normal, correspond to an edge of a reference facet of the reference heliostat.

Example 9. The method of example 8, wherein the edge of the reference facet includes two points on the reference facet that correspond to upper corners of the reference facet on the reference heliostat.

Example 10. The method of example 1, wherein the one or more features of the reference heliostat identifiable in the reflection, used to determine the calculated surface normal, correspond to fiducial marks located on the reference facets.

Example 11. The method of example 1, wherein the calculated surface normal is determined from a plurality of points on the assessed facet.

Example 12. The method of example 1, wherein the calculated surface normal is determined from a plurality of points on the assessed heliostat.

Example 13. A computing device for aligning heliostats in a heliostat field with a solar receiver, comprising a radio module and a processor coupled to the radio module. The processor configured to: receive a measuring image of an assessed heliostat in the heliostat field, wherein the measuring image of the assessed heliostat includes an assessed facet forming a reflective surface of the assessed heliostat, wherein at least a portion of a reference heliostat is visible in a reflection on the assessed facet; determine a surface normal variance between a calculated surface normal of the assessed heliostat and a presumed surface normal of the assessed heliostat, wherein the calculated surface normal is determined from a point on the assessed facet that corresponds to one or more features of the reference heliostat identifiable in the reflection; and update the presumed surface normal of the assessed heliostat based on the determined surface normal variance.

Example 14. The computing device of example 13, wherein the measuring image is collected by the UAV while traversing along a predetermined flight path, wherein the UAV traverses the predetermined flight path over the assessed heliostat with a characteristic selected from at least one of a constant heading, a constant speed, or a constant gaze angle of an imaging sensor used to collect the measuring image.

Example 15. The computing device of example 13, wherein the processor is further configured to collect a locating image of the assessed heliostat, wherein an edge of the assessed heliostat visible in the locating image identifies the assessed heliostat.

Example 16. The computing device of example 13, wherein the one or more features of the reference heliostat identifiable in the reflection, used to determine the calculated surface normal, correspond to an edge of a reference facet of the reference heliostat.

Example 17. A heliostat field alignment system, comprising an assessed and a reference heliostat arranged in the heliostat field, wherein the assessed heliostat includes an assessed facet forming a reflective surface of the assessed heliostat; an unmanned aerial vehicle (UAV) configured to collect a measuring image of the assessed heliostat, wherein at least a portion of the reference heliostat is visible in a reflection on the assessed facet; and a computing device configured to determine a surface normal variance between a calculated surface normal of the assessed heliostat and a presumed surface normal of the assessed heliostat, wherein the calculated surface normal is determined from a point on the assessed facet that corresponds to one or more features of the reference heliostat identifiable in the reflection, wherein the computing device is configured to update the presumed surface normal of the assessed heliostat based on the determined surface normal variance.

Example 18. The heliostat field alignment system of example 17, further comprising a solar receiver configured to collect reflected sunlight from the heliostat field, where in the updated presumed surface normal of the assessed heliostat is configured to bisect an angle between the Sun and a target area of the solar receiver.

Example 19. The heliostat field alignment system of example 17, wherein the measuring image is collected by the UAV while traversing along a predetermined flight path, wherein the UAV traverses the predetermined flight path over the assessed heliostat with a characteristic selected from at least one of a constant heading, a constant speed, or a constant gaze angle of an imaging sensor used to collect the measuring image.

Example 20. The heliostat field alignment system of example 17, wherein the computing device is further configured to collect a locating image of the assessed heliostat, wherein an edge of the assessed heliostat visible in the locating image identifies the assessed heliostat.

The foregoing method descriptions and the process flow diagrams are provided merely as illustrative examples and are not intended to require or imply that the operations of various embodiments must be performed in the order presented. As will be appreciated by one of skill in the art, the order of operations in the foregoing embodiments may be performed in any order. Words such as "thereafter," "then," "next," etc., are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents, and publications cited above are hereby incorporated by reference.

In addition, many modifications may be made to adapt a particular situation or material to the teachings of the disclosure without departing from the essential scope thereof. Therefore, it is intended that the disclosure is not limited to the particular embodiment disclosed as the best mode contemplated for carrying out this disclosure, but that the disclosure will include all embodiments falling within the scope of the appended claims.

What is claimed is:

1. A method for performing heliostat optical alignment, comprising:

collecting, by an unmanned aerial vehicle (UAV), a measuring image of an assessed heliostat in a heliostat field, wherein the measuring image of the assessed heliostat includes an assessed facet forming a reflective surface of the assessed heliostat, wherein at least a portion of a reference heliostat is visible in a reflection on the assessed facet;

determining a surface normal variance between a calculated surface normal of the assessed heliostat and a presumed surface normal of the assessed heliostat, wherein the calculated surface normal is determined from a point on the assessed facet that corresponds to one or more features of the reference heliostat identifiable in the reflection; and updating the presumed surface normal of the assessed heliostat based on the determined surface normal variance; and determining if the updated surface normal of the assessed heliostat requires that the assessed heliostat requires re-alignment.

2. The method of claim 1, wherein the measuring image is collected by the UAV while traversing along a predetermined flight path, wherein the UAV traverses the predetermined flight path over the assessed heliostat with a characteristic selected from at least one of a constant heading, a constant speed, or a constant gaze angle of an imaging sensor used to collect the measuring image.

3. The method of claim 2, wherein the predetermined flight path passes the assessed heliostat from one of a front-to-back direction or a back-to-front direction of the assessed heliostat.

4. The method of claim 2, wherein the predetermined flight path passes the assessed heliostat in a direction with a lateral component, wherein the lateral component traverses laterally relative to the assessed heliostat.

5. The method of claim 2, wherein the predetermined flight path passes the assessed heliostat in a lateral direction relative to the assessed heliostat.

6. The method of claim 1, further comprising:

collecting a locating image of the assessed heliostat, wherein an edge of the assessed heliostat visible in the locating image identifies the assessed heliostat.

7. The method of claim 6, wherein the locating image does not contain the reflection of the reference heliostat.

8. The method of claim 1, wherein the one or more features of the reference heliostat identifiable in the reflection, used to determine the calculated surface normal, correspond to an edge of a reference facet of the reference heliostat.

9. The method of claim 8, wherein the edge of the reference facet includes two points on the reference facet that correspond to upper corners of the reference facet on the reference heliostat.

10. The method of claim 1, wherein the one or more features of the reference heliostat identifiable in the reflection, used to determine the calculated surface normal, correspond to fiducial marks located on the reference facet.

11. The method of claim 1, wherein the calculated surface normal is determined from a plurality of points on the assessed facet.

12. The method of claim 1, wherein the calculated surface normal is determined from a plurality of points on the assessed heliostat.

13. A computing device for aligning heliostats in a heliostat field with a solar receiver, comprising:

a radio module; and a processor coupled to the radio module and configured to:

receive a measuring image of an assessed heliostat in the heliostat field, wherein the measuring image of the assessed heliostat includes an assessed facet forming a reflective surface of the assessed heliostat, wherein at least a portion of a reference heliostat is visible in a reflection on the assessed facet;

determine a surface normal variance between a calculated surface normal of the assessed heliostat and a presumed surface normal of the assessed heliostat, wherein the calculated surface normal is determined from a point on the assessed facet that corresponds to one or more features of the reference heliostat identifiable in the reflection; and update the presumed surface normal of the assessed heliostat based on the determined surface normal variance.

14. The computing device of claim 13, wherein the measuring image is collected by an unmanned aerial vehicle (UAV) while traversing along a predetermined flight path, wherein the UAV traverses the predetermined flight path over the assessed heliostat with a characteristic selected from at least one of a constant heading, a constant speed, or a constant gaze angle of an imaging sensor used to collect the measuring image.

15. The computing device of claim 13, wherein the processor is further configured to:

collect a locating image of the assessed heliostat, wherein an edge of the assessed heliostat visible in the locating image identifies the assessed heliostat.

16. The computing device of claim 13, wherein the one or more features of the reference heliostat identifiable in the reflection, used to determine the calculated surface normal, correspond to an edge of a reference facet of the reference heliostat.

17. A heliostat field alignment system, comprising:

an assessed heliostat and a reference heliostat arranged in a heliostat field, wherein the assessed heliostat includes an assessed facet forming a reflective surface of the assessed heliostat;

an unmanned aerial vehicle (UAV) configured to collect a measuring image of the assessed heliostat, wherein at least a portion of the reference heliostat is visible in a reflection on the assessed facet; and a computing device configured to determine a surface normal variance between a calculated surface normal of the assessed heliostat and a presumed surface normal of the assessed heliostat, wherein the calculated surface normal is determined from a point on the assessed facet that corresponds to one or more features of the reference heliostat identifiable in the reflection, wherein the computing device is configured to update the presumed surface normal of the assessed heliostat based on the determined surface normal variance.

18. The heliostat field alignment system of claim 17, further comprising:

a solar receiver configured to collect reflected sunlight from the heliostat field, wherein the updated presumed surface normal of the assessed heliostat is configured to bisect an angle between the Sun and a target area of the solar receiver.

19. The heliostat field alignment system of claim 17, wherein the measuring image is collected by the UAV while traversing along a predetermined flight path, wherein the UAV traverses the predetermined flight path over the assessed heliostat with a characteristic selected from at least one of a constant heading, a constant speed, or a constant gaze angle of an imaging sensor used to collect the measuring image.

20. The heliostat field alignment system of claim 17, wherein the computing device is further configured to collect a locating image of the assessed heliostat, wherein an edge of the assessed heliostat visible in the locating image identifies the assessed heliostat.

* * * * *